(12) United States Patent  (10) Patent No.: US 7,958,240 B2
Futa et al.  (45) Date of Patent: Jun. 7, 2011

(54) GROUP JUDGMENT DEVICE

(75) Inventors: Yuichi Futa, Osaka (JP); Hiroki Yamauchi, Ibaraki (JP); Yuusaku Ohta, Neyagawa (JP); Natsume Matsuzaki, Mino (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 12/266,010

(22) Filed: Nov. 6, 2008

(65) Prior Publication Data

US 2009/0070483 A1  Mar. 12, 2009

Related U.S. Application Data

(62) Division of application No. 10/669,656, filed on Sep. 25, 2003.

(30) Foreign Application Priority Data

Sep. 27, 2002 (JP) ................................ 2002-282626
Oct. 10, 2002 (JP) ................................ 2002-297289
Nov. 27, 2002 (JP) ................................ 2002-344022
Mar. 20, 2003 (JP) ................................ 2003-078693

(51) Int. Cl.
*G06F 15/173* (2006.01)
(52) U.S. Cl. ......... 709/226; 709/217; 709/223; 709/232
(58) Field of Classification Search .................. 709/221, 709/223, 224, 204, 217, 232; 370/392, 401
See application file for complete search history.

(56) References Cited

U.S. PATENT DOCUMENTS

| 5,742,759 | A | 4/1998 | Nessett et al. |
| 5,857,009 | A * | 1/1999 | Handig ......................... 370/357 |
| 6,192,404 | B1 | 2/2001 | Hurst et al. |
| 6,438,375 | B1 | 8/2002 | Müller |
| 6,446,121 | B1 * | 9/2002 | Shah et al. ..................... 709/224 |
| 6,697,383 | B1 | 2/2004 | Li et al. |
| 6,728,850 | B2 * | 4/2004 | Gotoh et al. .................. 711/167 |
| 6,898,776 | B1 * | 5/2005 | Jacobson et al. .............. 716/117 |
| 6,959,333 | B2 | 10/2005 | Beaumont et al. |
| 7,016,355 | B1 * | 3/2006 | Graf et al. ..................... 370/401 |
| 7,349,396 | B2 * | 3/2008 | Ohta et al. ..................... 370/392 |
| 7,586,944 | B2 * | 9/2009 | Messick et al. ............... 709/219 |
| 7,747,729 | B2 * | 6/2010 | Levy et al. ..................... 709/224 |

(Continued)

FOREIGN PATENT DOCUMENTS

CN  1276573  12/2000

(Continued)

OTHER PUBLICATIONS

U.S. Office Action dated Aug. 18, 2009 in U.S. Appl. No. 10/669,656.

(Continued)

*Primary Examiner* — Ramy M Osman
(74) *Attorney, Agent, or Firm* — Wenderoth, Lind & Ponack, L.L.P.

(57) ABSTRACT

In a server, an echo-request transmitting unit transmits echo-request data to a target device, and an echo-reply receiving unit receives echo-reply data from the target device. A time measuring unit measures, as the target time, the time required between transmission of the echo-request data and reception of the echo-reply data, and compares the target time with the reference time. In this way, the server judges whether the target device connected to its network belongs to a predetermined group.

22 Claims, 25 Drawing Sheets

U.S. PATENT DOCUMENTS

| | | | |
|---|---|---|---|
| 2001/0037438 A1 | | 11/2001 | Mathis |
| 2002/0194361 A1* | | 12/2002 | Itoh et al. ............... 709/224 |
| 2003/0009594 A1 | | 1/2003 | McElligott |
| 2003/0033404 A1* | | 2/2003 | Richardson ............ 709/224 |
| 2003/0048793 A1 | | 3/2003 | Pochon et al. |
| 2003/0076955 A1* | | 4/2003 | Alve et al. ............... 380/201 |
| 2003/0105956 A1 | | 6/2003 | Ishiguro et al. |
| 2003/0108205 A1 | | 6/2003 | Joyner et al. |
| 2003/0123438 A1 | | 7/2003 | Li et al. |
| 2003/0161476 A1 | | 8/2003 | Fransdonk |
| 2003/0231629 A1 | | 12/2003 | Banerjee et al. |
| 2003/0233540 A1 | | 12/2003 | Banerjee et al. |
| 2004/0098579 A1 | | 5/2004 | Nakano et al. |
| 2004/0122975 A1 | | 6/2004 | Lennestal et al. |
| 2004/0156384 A1 | | 8/2004 | Rune et al. |
| 2004/0267922 A1* | | 12/2004 | Rover et al. ............ 709/223 |
| 2005/0198662 A1 | | 9/2005 | Endo et al. |
| 2008/0201371 A1* | | 8/2008 | Murakami ............. 707/104.1 |
| 2008/0263367 A1 | | 10/2008 | Tatebayashi et al. |

FOREIGN PATENT DOCUMENTS

| | | |
|---|---|---|
| EP | 2 362 062 | 11/2001 |
| GB | 2 362 062 | 11/2001 |
| JP | 10-271154 | 10/1998 |
| JP | 11-275099 | 10/1999 |
| JP | 2001-285284 | 10/2001 |
| TW | 346571 | 2/1986 |
| TW | 470984 | 1/2002 |
| TW | 493356 | 7/2002 |
| TW | 498206 | 8/2002 |
| WO | 00/52948 | 9/2000 |
| WO | 01/57696 | 8/2001 |
| WO | 02/067499 | 8/2002 |

OTHER PUBLICATIONS

Copending Application of Hiroki Yamauchi et al., U.S. Appl. No. 10/649,624, filed Aug. 28, 2003, entitled "Content-Duplication Management System, Apparatus and Method, Playback Apparatus and Method, and Computer Program".

Copending Application of Natsume Matsuzaki et al., U.S. Appl. No. 10/649,678, filed Aug. 28, 2003, entitled "Group Formation/Management System, Group Management Device, and Member Device".

Copending Application of Yuusaku Ohta et al., U.S. Appl. No. 10/649,890, filed Aug. 28, 2003, entitled "Content Duplication Management System and Networked Apparatus".

Copending Application of Yuusaku Ohta et al., U.S. Appl. No. 10/649,623, filed Aug. 28, 2003, entitled "Key Delivery Apparatus, Terminal Apparatus, Recording Medium, and Key Delivery System".

Leonhardt, U., et al., "Location Service in Mobile Computing Environments", 1996, Computers and Graphics, Pergamon Press Ltd., Oxford, GB, vol. 20, NR. 5, pp. 627-632 XP004015413, ISSN: 0097-8493, the whole document.

Copending Application of Yuusaku Ohta et al., U.S. Appl. No. 10/670,053, filed Sep. 25, 2003, entitled "Content Distribution System".

U.S. Office Action mailed Mar. 20, 2007 issued in the U.S. Appl. No. 10/670,053.

U.S. Office Action mailed Jul. 16, 2007 issued in the U.S. Appl. No. 10/670,053.

European Search Report issued in European Application No. 03 79 8478 dated Oct. 27, 2005.

International Search Report issued in PCT/JP 03/12197, dated Feb. 23, 2004.

* cited by examiner

FIG.6

| SECOND CONNECTING MEDIUM \ FIRST CONNECTING MEDIUM | 100Base (IEEE802.3) | IEEE 802.11a | IEEE 802.11b |
|---|---|---|---|
| 100Base(IEEE802.3) | Ref1 | Ref2 | Ref3 |
| IEEE802.11a | Ref2 | Ref2 | Ref3 |
| IEEE802.11b | Ref3 | Ref3 | Ref3 |

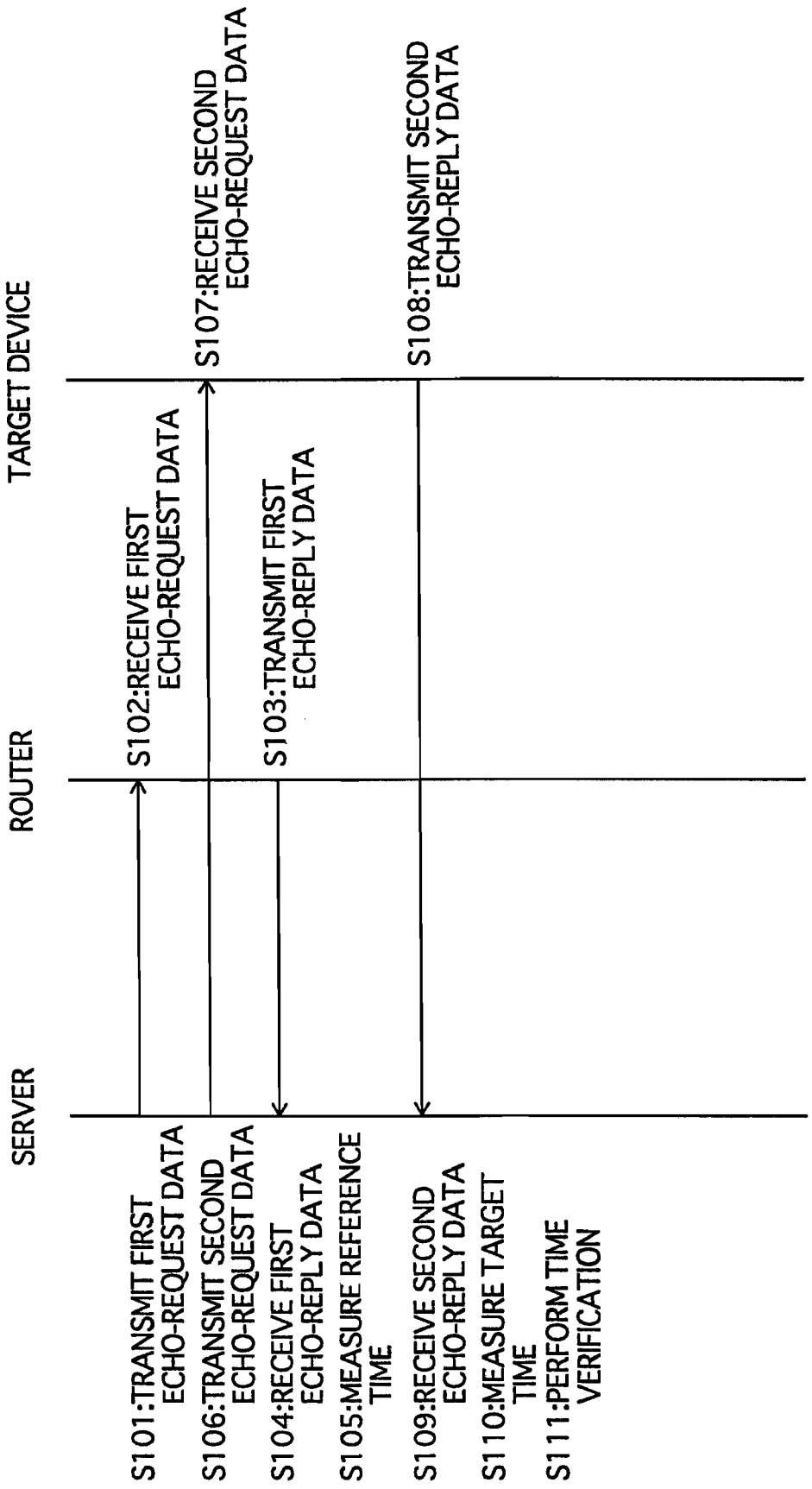

GROUP JUDGMENT DEVICE

This application is a Rule 1.53(b) Divisional application of Ser. No. 10/669,656, filed Sep. 25, 2003.

BACKGROUND OF THE INVENTION

1. Technical Field

The present invention relates to a group judgment device that judges whether a device connected to its network belongs to a predetermined group.

2. Background Art

Recent years have seen the realization of home networking, i.e., networking home devices for sharing various pieces of content among them. As one form of home networking, devices including a television set and a videocassette recorder are star-connected, via one router installed in a home, to a server storing pieces of content. Within such a home network, the router is assumed to be the only device connected to an external network. The server obtains various pieces of content from the external network via this router, and stores therein the obtained pieces of content. The server can then distribute various pieces of content to the devices according to their requests. In this way, the devices can share various pieces of content among them.

In view of copyright protection, however, unlimited sharing of content is not permitted. For pieces of content whose use is limited only to devices within the home network, their distribution to devices external to the home network should be strictly prohibited. In this specification, a group that is composed of exclusive devices permitted to share content is referred to as the "AD (Authorized Domain)". Upon every receipt of a content distribution request from a device, therefore, the server first judges whether the device belongs to the AD.

One method for the judgment uses IDs of devices belonging to the AD. This method requires the user to manually register, with the server, IDs of all the devices belonging to the AD.

As one example, the TCP Wrapper can be used to realize this judgment method. In the case of the TCP Wrapper, the user manually registers, into a file named "hosts. allow", computers having access to service provided by the server. Reference: Sakae Kumehara "*Linux Network Firewall Management Guide*", Softbank, Chapter 4.2.2

SUMMARY OF THE INVENTION

However, the above judgment method requiring the user's manual operations has the following problems.

The first problem is that the method, which requires the user's manual operations of registering devices belonging to the AD, places huge burdens on the user, particularly on some users who may be unfamiliar with device operations. Such operations prior to use of devices are desired to be minimized.

The second problem is that the user may conspire with a third party and register the third party's device that does not belong to the AD, with the intension of distributing content to such an unauthorized device. If this happens, protection of content against unlimited sharing can be broken.

In view of these problems, the present invention aims at providing a technique for judging whether devices belong to the AD, without requiring the user's manual operations of registering the devices and thereby preventing the user from registering an unauthorized device.

The above aim of the present invention can be fulfilled by a group judgment device that is connected to a network, including: a target time obtaining unit operable to obtain, as a target time, a time required by data with a predetermined format to travel to and/or from a target device connected to the network; and a judgment unit operable to compare the target time with a reference time, the reference time being a time required by data with the predetermined format to travel to and/or from a device belonging to a predetermined group, and judge that the target device belongs to the group when a difference between the target time and the reference time is within a predetermined range, and judge that the target device is external to the group when the difference is not within the predetermined range.

According to this construction, the group judgment device judges whether the target device belongs to a predetermined group, based on a difference between the target time required for communication with the target device and the reference time required for communication with a device belonging to the group. Here, one example of the predetermined group is the AD.

In this way, the group judgment device can obtain a criterion for the judgment as to whether the target device belongs to the group, without relaying on the user.

Accordingly, the group judgment device does not place burdens on the user of manually registering devices belonging to the group, and thereby also prevents the user from registering, as a device belonging to the group, an unauthorized device not belonging to the group.

Also, the group judgment device may further include a judgment request receiving unit operable to receive, from the target device, a request to judge whether the target device belongs to the group, wherein the target time obtaining unit obtains the target time when the judgment request receiving unit receives the request.

According to this construction, the group judgment device newly obtains the target time upon every receipt of such a judgment request from the target device. Assume for example that the group judgment device has such a construction that it registers a device once judged to belong to the group and thereafter does not perform the judgment on the registered device. In this case, once an unauthorized device is mistakenly registered therein, the group judgment device cannot avoid subsequent access from such an unauthorized device.

To avoid such a case, the group judgment device of the present invention newly obtains the target time before every access from a device, thereby improving security.

Also, the target time obtaining unit may include: a transmission/reception subunit operable to transmit first data with a predetermined format to the target device and receive, from the target device, second data with a predetermined format transmitted in response to the first data; and a measurement subunit operable to measure, as the target time, a time required between (a) transmission of the first data by the transmission/reception subunit and (b) reception of the second data by the transmission/reception subunit.

According to this construction, the group judgment device actually measures, as the target time, the time required for transmission of the first data and the second data.

In this way, the group judgment device measures the target time. Therefore, the group judgment device does not place burdens on the user of manually registering devices belonging to the AD, and thereby also prevents the user from registering, as a device belonging to the AD, an unauthorized device not belonging to the AD.

Also, the transmission/reception subunit may transmit to the target device, as the first data, echo-request data based on the Internet Control Message Protocol, and receive from the target device, as the second data, echo-reply data corresponding to the echo-request data.

According to this construction, the group judgment device can obtain the target time, by utilizing echo-request data and echo-reply data based on the ICMP, i.e., by utilizing the existing program Ping.

The group judgment device utilizing such an existing program does not require a new program to be developed for transmitting and receiving the first and the second data. This reduces burdens on developers of the group judgment device.

Also, time synchronization may be achieved with the target device, and the target time obtaining unit may include: a time determining subunit operable to determine a transmission-start time at which transmission of the data with the predetermined format is to be started; a time notifying subunit operable to notify the target device of the transmission-start time determined by the time determining subunit; a reception subunit operable to receive the data with the predetermined format that the target device transmits at the transmission-start time; and a calculation subunit operable to calculate, as the target time, a time period between (a) a time at which the data with the predetermined format is received by the reception subunit and (b) the transmission-start time determined by the time determining subunit.

According to this construction, the group judgment device actually measures, as the target time, the time required for transmission of the data with the predetermined format.

In this way, the group judgment device measures the target time. Therefore, the group judgment device does not place burdens on the user of manually registering devices belonging to the AD, and thereby also prevents the user from registering, as a device belonging to the AD, an unauthorized device not belonging to the AD.

Also, the target device may measure the target time and transmits target time information indicating the target time, and the target time obtaining unit may receive the target time information from the target device.

According to this construction, the target device measures the target time, and the group judgment device obtains target time information indicating the target time from the target device.

Accordingly, the group judgment device makes the target device shoulder a part of the group judgment process. In this way, the processing to be executed by the group judgment device can be reduced.

Also, the group judgment device may further include a pre-storing unit operable to store therein a predetermined number of values of the target time, wherein the target time obtaining unit employs, as the target time to be used for the comparison by the judgment unit, a smallest value, among the values stored in the pre-storing unit and a value of the obtained target time.

According to this construction, the group judgment device employs, as the target time, the smallest value of a plurality of values obtained by measurement performed a plurality of times. In this way, the group judgment device can obtain an accurate value of the target time. This is due to the following reason.

Assume here that the target time is measured for a communication path on which the target device is to transmit the second data in response to the first data. If this communication path is occupied by other data, the target device waits until the communication path becomes available and then transmits the second data.

In this case, the group judgment device measures, as the target time, a value obtained by adding the waiting time to the actual transmission time. However, the second data is so small in data size that it may be inserted between parts of the large-size other data occupying the communication path.

The second data is considered to be transmitted as being inserted in this way at least once in a plurality of times of the measurement, thereby enabling the group judgment device to use the actual transmission time as the target time.

Also, the judgment unit may store therein a value set in advance as the reference time.

According to this construction, the group judgment device judges whether the target device belongs to a predetermined group based on the reference time set at the time of manufacture or shipment of the group judgment device.

Accordingly, the group judgment device can obtain the reference time by simply reading it from a ROM or the like.

Due to this, the group judgment device can have a simplified construction.

Also, the judgment unit may include: a reference time storing subunit operable to store therein a value of the reference time set respectively for a connecting medium via which the target device is connected to the network; a reception subunit operable to receive, from the target device, medium information indicating the connecting medium via which the target device is connected to the network; and a selection subunit operable to select, as the reference time, the value stored in the reference time storing subunit, based on the medium information received by the reception subunit.

According to this construction, the group judgment device can select a value of the reference time according to a connecting medium via which the target device is connected to the network. Here, examples of connecting mediums include cabling 100Base (defined by IEEE802.3), wireless IEEE802.11a and IEEE802.11b, and powerline communication HomePlug.

The group judgment device can select a value of the reference time suitable for each situation, and therefore can judge more accurately whether the target device belongs to the group than in the case where a value of the reference time is selected based only on the connection medium of the target device.

Also, the judgment unit may include: a reference time storing subunit operable to store a value of the reference time set for a combination of (a) a first connecting medium via which the group judgment device is connected to the network and (b) a second connecting medium via which the target device is connected to the network; a medium detecting subunit operable to detect the first connecting medium; a reception subunit operable to receive, from the target device, medium information indicating the second connecting medium; and a selection subunit operable to select, as the reference time, the value stored in the reference time storing subunit, based on the combination of (c) the first connecting medium detected by the medium detecting unit and (d) the second connecting medium indicated by the medium information received by the reception subunit.

According to this construction, the group judgment device can select a value of the reference time according to each combination of the first connecting medium via which the group judgment device is connected to the network and the second connecting medium via which the target device is connected to the network.

In this way, the group judgment device can select a value of the reference time suitable for each situation, and therefore, can judge more accurately whether the target device belongs to the group than in the case where the reference time is a fixed value.

Also, the group judgment device may further include a change receiving unit operable to receive a new value of the reference time from an external source, wherein the reference time storing subunit replaces a value stored therein as the reference time, with the new value received by the change receiving unit.

According to this construction, the group judgment device can change the reference time.

There may be cases where the reference time set in advance is no longer appropriate due to a difference between the actual network environment and the network environment expected at the time of manufacture. If this happens, such misjudgment may occur as that an authorized device is judged not to belong to the group, or that an unauthorized device is judged to belong to the group. For the purpose of avoiding such misjudgment, the group judgment device can change the reference time when the reference time set in advance is no longer appropriate.

Also, the judgment unit may include: a transmission/reception subunit operable to transmit first data with a predetermined format to a router nearest to the group judgment device in the network, and receive, from the router, second data with a predetermined format transmitted in response to the first data; and a measurement subunit operable to measure, as the reference time, a time required between (a) transmission of the first data by the transmission/reception subunit and (b) reception of the second data by the transmission/reception subunit.

According to this construction, the group judgment device obtains not only the target time but also the reference time by actual measurement.

In this way, the group judgment device can obtain the reference time determined depending on the communication traffic at the time of the group judgment process, and can judge more accurately whether the target device belongs to the group than in the case where the reference time is a fixed value.

Also, the group judgment device employs, as the reference time, the time required between (a) the transmission of the first data and (b) the reception of the second data, via a router nearest to the group judgment device.

Assume for example that the group judgment device employs, as the target time, the time required between (a) the transmission of the first data by the target device and (b) the reception of the second data, and judges that the target device belongs to the group when the target time and the reference time are substantially the same. In this case, the device, whose nearest router is the above router used for the measurement of the reference time, is judged to belong to the group.

Also, the group judgment device may be connected to a reference device via one router, the reference device having been judged to belong to the group, and the judgment unit may include: a transmission/reception subunit operable to transmit first data with a predetermined format to the reference device and receive, from the reference device, second data with a predetermined format transmitted in response to the first data; and a measurement subunit operable to measure, as the reference time, a time required between (a) transmission of the first data by the transmission/reception subunit and (b) reception of the second data by the transmission/reception subunit.

According to this construction, the group judgment device obtains not only the target time but also the reference time by actual measurement.

In this way, the group judgment device can obtain the reference time determined depending on the communication traffic at the time of the group judgment process, and can judge more accurately whether the target device belongs to the group than in the case where the reference time is a fixed value.

Further, the group judgment device employs, as the reference time, the time required between (a) the transmission of the first data and (b) the reception of the second data, via a router nearest to the group judgment device.

Assume for example that the group judgment device employs, as the target time, the time required between (a) the transmission of the first data and (b) the reception of the second data returned by the target device in response to the first data, and judges that the target device belongs to the group when the target time and the reference time are substantially the same. In this case, the device, whose nearest router is the above router used for the measurement of the reference time, is judged to belong to the group.

Also, the transmission/reception subunit may transmit to the reference device, as the first data, echo-request data based on the Internet Control Message Protocol, and receive from the reference device, as the second data, echo-reply data corresponding to the echo-request data.

According to this construction, the group judgment device can obtain the reference time, by utilizing echo-request data and echo-reply data based on the ICMP, i.e., by utilizing the existing program Ping.

The group judgment device utilizing such an existing program does not require a new program to be developed for transmitting and receiving the first data and the second data. This reduces burdens on developers of the group judgment device.

Also, the group judgment device may further include a pre-storing unit operable to store therein a predetermined number of values of the reference time, wherein the judgment unit employs, as the reference time to be used for the comparison, a smallest value, among the values stored in the pre-storing unit and a value of the measured reference time.

According to this construction, the group judgment device can obtain a more accurate value for the reference time. This is due to the following reason.

Assume here that the reference time is measured for a communication path on which the reference device is to transmit the second data in response to the first data. If this communication path is occupied by other data, the reference device waits until the communication path becomes available and then transmits the second data.

In this case, the group judgment device measures, as the reference time, a value obtained by adding the waiting time to the actual transmission time. However, the second data is so small in data size that it may be inserted between parts of the large-size other data occupying the communication path. The second data is considered to be transmitted as being inserted in this way at least once in a plurality of times of the judgment, thereby enabling the group judgment device to use the actual transmission time as the reference time.

Also, the judgment unit may judge that the target device belongs to the group when the target time is equal to or shorter than the reference time, and judge that the target device is external to the group when the target time is not equal to or shorter than the reference time.

According to this construction, the group judgment device can judge that the target device belongs to a predetermined group when the target time is equal to or shorter than the reference time. To be more specific, the group judgment device judges whether a value resulting from subtracting the reference time from the target time is a negative value or a positive value, and when the resulting value is a negative value, judges that the target device belongs to the predetermined group.

In this way, the group judgment device can judge whether the difference is within a predetermined range by simply judging whether the resulting value is a negative value or a positive value. Therefore, the group judgment device can have a simplified construction.

Also, the group judgment device may be connected to the target device via one router or via a plurality of routers, and the judgment unit may judge that the target device belongs to the group when the difference is shorter than a time required by the data with the predetermined format to travel via one router, and judge that the target device is external to the group when the difference is not shorter than the time required by the data with the predetermined format to travel via one router.

According to this construction, the group judgment device judges that the target device belongs to a predetermined group when a difference between the target time and the reference time is in a range of values smaller than the time required by the data with a predetermined format to travel via one router.

Assume for example that the target time and the reference time can be obtained by actual measurement. In this case, when the number of routers on a target path for which the target time is measured is the same as the number of routers on a reference path for which the reference time is measured, the group judgment device judges that the target device belongs to a predetermined group. On the other hand, when the number of routers on the target path is different even by one from the number of routers on the reference path, the group judgment device judges that the target device does not belong to the predetermined group.

The above aim of the present invention can also be fulfilled by a group judgment device that is connected to a network and that shares common private information with a target device connected to the network, including: a conversion unit operable to subject the private information to predetermined conversion, to generate first conversion information; a transmission/reception unit operable to transmit first data with a predetermined format to the target device, and receive, from the target device, second data with a predetermined format transmitted in response to the first data, the second data including second conversion information that has been generated by the target device subjecting the private information to the predetermined conversion; a measurement unit operable to measure, as a target time, a time required between (a) transmission of the first data by the transmission/reception unit and (b) reception of the second data by the transmission/reception unit; and a judgment unit operable to (i) compare the target time measured by the measurement unit with a reference time, the reference time being a time required by data with a predetermined format to travel to and from a device belonging to a predetermined group, and (ii) compare the first conversion information generated by the conversion unit and the second conversion information included in the second data received by the transmission/reception unit, and judge that the target device belongs to the group in an affirmative case where (i) a difference between the target time and the reference time is within a predetermined range and (ii) the first conversion information and the second conversion information match, and judge that the target device is external to the group in any case other than the affirmative case.

According to this construction, the group judgment device judges whether the target device belongs to the predetermined group based on both the time verification and the authenticity verification. Here, the time verification is realized by obtaining as the target time, the time required between transmission of the first data and reception of the second data, and judges whether a difference between the target time and the reference time is in a predetermined range. Also, the authenticity verification is realized by judging whether first conversion information generated by the group judgment device and second conversion information generated by the target device match.

Accordingly, by not only the time verification but also the authenticity verification, the group judgment device can prevent spoofing by an unauthorized device and also can improve security.

The above aim of the present invention can also be fulfilled by a group judgment device that is connected to a network and that shares common private information with a target device connected to the network, including: a conversion unit operable to subject the private information to first conversion to generate first conversion information, and subject the private information to second conversion that is different from the first conversion, to generate second conversion information; a transmission/reception unit operable to transmit first data with a predetermined format including the first conversion information to the target device, and receive, from the target device, second data with a predetermined format transmitted in response to the first data, the second data including third conversion information that has been generated by the target device subjecting the private information to the second conversion; a measurement unit operable to measure, as a target time, a time required between (a) transmission of the first data by the transmission/reception unit and (b) reception of the second data by the transmission/reception unit; and a judgment unit operable to (i) compare the target time measured by the measurement unit with a reference time, the reference time being a time required by data with a predetermined format to travel to and from a device belonging to a predetermined group, and (ii) compare the second conversion information generated by the conversion unit and the third conversion information included in the second data received by the transmission/reception unit, and (iii) judge whether a message indicating that fourth conversion information and the first conversion information match has been received from the target device, the fourth conversion information having been generated by the target device subjecting the private information to the first conversion, and judge that the target device belongs to the group in an affirmative case where (i) a difference between the target time and the reference time is within a predetermined range, (ii) the second conversion information and the third conversion information match, and (iii) the message has been received, and judge that the target device is external to the group in any case other than the affirmative case.

According to this construction, the group judgment device judges whether the target device belongs to the predetermined group based on the time verification and the mutual authenticity verification. Here, the mutual authenticity verification is realized by both authenticity verification performed by the group judgment device and authenticity verification performed by the target device.

Accordingly, the group judgment device can further improve security compared with the case where the authenticity verification is based only on the authenticity verification performed by the group judgment device.

The above aim of the present invention can also be fulfilled by a target device that is connected to a network and that shares common private information with a group judgment device connected to the network, the target device being judged by the group judgment device as to whether or not to belong to a predetermined group, the target device including: a reception unit operable to receive first data with a predetermined format from the group judgment device; a conversion unit operable to subject the private information to predetermined conversion, to generate first conversion information, before the reception unit receives the first data; and a transmission unit operable to transmit second data with a predetermined format including the first conversion information to the group judgment device, when the reception unit receives the first data.

According to this construction, the target device receives first data with a predetermined format from the group judgment device, and transmits second data with a predetermined format including first conversion information to the group judgment device. Here, the first conversion information has been generated prior to the reception of the first data. Therefore, the time required between (a) the reception of the first data and (b) the transmission of the second data can be shortened. Assume here that the group judgment device transmits the first data to the target device and judges whether the target device belongs to a predetermined group based on the target time required between the transmission of the first data and the reception of the second data. In this case, the time required to generate the first conversion information is not included in the target time.

Accordingly, even when the time required to generate first conversion information is relatively long compared with the target time, the group judgment device can appropriately judge whether the target device belongs to the group.

The above aim of the present invention can also be fulfilled by a target device that is connected to a network and that shares common private information with a group judgment device connected to the network, the target device being judged by the group judgment device as to whether or not to belong to a predetermined group, the target device including: a reception unit operable to receive first data with a predetermined format from the group judgment device; a conversion unit operable to subject the private information to predetermined conversion, to generate first conversion information, before the reception unit receives the first data; and a transmission unit operable to transmit second data with a predetermined format including the first conversion information to the group judgment device, when the reception unit receives the first data.

According to this construction, the target device transmits a result of comparison between the first conversion information transmitted from the group judgment device and the third conversion information generated by the target device, to the group judgment device. Due to this, the group judgment device can use the comparison result transmitted by the target device for the group judgment process.

Accordingly, the group judgment device can further improve security compared with the case where the authenticity verification is performed based only on its own comparison result.

The above aim of the present invention can also be fulfilled by a group judgment system including a target device and a group judgment device that are connected to a network, the target device and the group judgment device sharing common private information in advance, wherein the target device includes: a reception unit operable to receive first data with a predetermined format from the group judgment device; a first conversion unit operable to subject the private information to predetermined conversion, to generate first conversion information, before the reception unit receives the first data; and a transmission unit operable to transmit second data with a predetermined format including the first conversion information to the group judgment device, when the reception unit receives the first data, and the group judgment device includes: a transmission/reception unit operable to transmit the first data to the target device, and receive the second data including the first conversion information; a measurement unit operable to measure, as a target time, a time required between (a) transmission of the first data by the transmission/reception unit and (b) reception of the second data by the transmission/reception unit; a second conversion unit operable to subject the private information to the predetermined conversion, to generate second conversion information; and a judgment unit operable to (i) compare the target time measured by the measurement unit with a reference time, the reference time being a time required by data with a predetermined format to travel to and from a device belonging to a predetermined group, and (ii) compare the second conversion information generated by the second conversion unit and the first conversion information included in the second data received by the transmission/reception unit, and judge that the target device belongs to the group in an affirmative case where (i) a difference between the target time and the reference time is within a predetermined range and (ii) the second conversion information and the first conversion information match, and judge that the target device is external to the group in any case other than the affirmative case.

According to this construction, the group judgment device judges whether the target device belongs to the predetermined group based on both the time verification and the authenticity verification. Here, the time verification is realized by obtaining the target time required between transmission of the first data and reception of the second data, and judges whether a difference between the target time and the reference time is in a predetermined range. Also, the authenticity verification is realized by judging whether first conversion information generated by the group judgment device and second conversion information generated by the target device match.

Accordingly, by not only the time verification but also the authenticity verification, the group judgment device can prevent spoofing by an unauthorized device and also can improve security.

The target device receives first data with a predetermined format from the group judgment device, and transmits second data with a predetermined format including first conversion information to the group judgment device.

Here, the first conversion information has been generated prior to the reception of the first data. Therefore, the time required to generate the first conversion information is not included in the target time.

Accordingly, even when the time required to generate first conversion information is relatively long compared with the target time, the group judgment device can appropriately judge whether the target device belongs to the group.

The above aim of the present invention can also be fulfilled by a group judgment system including a target device and a group judgment device that are connected to a network, the target device and the group judgment device sharing common private information in advance, wherein the target device includes: a reception unit operable to receive first data with a predetermined format including first conversion information from the group judgment device; a first conversion unit operable to subject the private information to first conversion, to generate second conversion information, before the reception unit receives the first data; a transmission unit operable to transmit second data with a predetermined format including the second conversion information to the group judgment device, when the reception unit receives the first data; a comparison unit operable to compare third conversion information and the first conversion information, the third conversion information having been generated by subjecting the private information to second conversion that is different from the first conversion; and a notification unit operable to notify the group judgment device of a result of the comparison by the comparison unit, and the group judgment device includes: a second conversion unit operable to subject the private information to the second conversion, to generate the first conversion information, and subject the private information to the first conversion, to generate fourth conversion information; a transmission/reception unit operable to transmit the first data including the first conversion information to the target device, and receive the second data including the second conversion information from the target device; a measurement unit operable to measure, as a target time, a time required between (a) transmission of the first data by the transmission/reception unit and (b) reception of the second data by the transmission/reception unit; and a judgment unit operable to (i) compare the target time measured by the measurement unit with a reference time, the reference time being a time required by data with a predetermined format to travel to and from a device belonging to a predetermined group, and (ii) compare the fourth conversion information generated by the second conversion unit and the second conversion information included in the second data received by the transmission/reception unit, and (iii) check the result of the comparison received from the target device indicating whether the first conversion information and the third conversion information match, and judge that the target device belongs to the group in an affirmative case where (i) a difference between the target time and the reference time is within a predetermined range, (ii) the fourth conversion information and the second conversion information match, and (iii) the result indicates that the first conversion information and the third conversion information match, and judge that the target device is external to the group in any case other than the affirmative case.

According to this construction, the group judgment device judges whether the target device belongs to the predetermined group based on both the time verification and the mutual authenticity verification. Here, the mutual authenticity verification is realized by both authenticity verification performed by the group judgment device and authenticity verification performed by the target device.

Accordingly, the group judgment device can further improve security compared with the case where the authenticity verification is based only on the authenticity verification performed by the group judgment device.

The above aim of the present invention can also be fulfilled by a group judgment method that is used by a group judgment device connected to a network, including: a target time obtaining step of obtaining, as a target time, a time required by data with a predetermined format to travel to and/or from a target device connected to the network; and a judgment step of comparing the target time with a reference time, the reference time being a time required by data with the predetermined format to travel to and/or from a device belonging to a predetermined group, and judging that the target device belongs to the group when a difference between the target time and the reference time is within a predetermined range, and judging that the target device is external to the group when the difference is not within the predetermined range.

According to this, the group judgment method can produce the same effects as produced by the group judgment device.

The above aim of the present invention can also be fulfilled by a group judgment program that is implemented by a computer connected to a network, including: a target time obtaining step of obtaining, as a target time, a time required by data with a predetermined format to travel to and/or from a target device connected to the network; and a judgment step of comparing the target time with a reference time, the reference time being a time required by data with the predetermined format to travel to and/or from a device belonging to a predetermined group, and judging that the target device belongs to the group when a difference between the target time and the reference time is within a predetermined range, and judging that the target device is external to the group when the difference is not within the predetermined range.

According to this, a computer implementing the group judgment program can produce the same effects as produced by the group judgment device.

The above aim of the present invention can also be fulfilled by a storage medium storing a group judgment program that is implemented by a computer connected to a network, the group judgment program including: a target time obtaining step of obtaining, as a target time, a time required by data with a predetermined format to travel to and/or from a target device connected to the network; and a judgment step of comparing the target time with a reference time, the reference time being a time required by data with the predetermined format to travel to and/or from a device belonging to a predetermined group, and judging that the target device belongs to the group when a difference between the target time and the reference time is within a predetermined range, and judging that the target device is external to the group when the difference is not within the predetermined range.

According to this, a computer reading the group judgment program from the storage medium and implementing the group judgment program can produce the same effects as produced by the group judgment device.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6 shows examples of values of the reference time stored in a reference time storing unit 221;

FIG. 25 shows the operations of the server, a router, and a target device relating to the sixth embodiment.

DETAILED DESCRIPTION OF THE INVENTION

First Embodiment

<Outline>

In the first embodiment of the present invention, a server judges whether a target device belongs to the AD (AD judgment process) in the following way. The server verifies, using time, whether the target device is within its home network by transmitting echo-request data to the target device, measuring, as the target time, the time required between (a) transmitting the echo-request data and (b) receiving echo-reply data corresponding to the transmitted echo-request data from the target device, and judging whether the target time is equal to or shorter than the reference time is set in advance. When the target time is equal to or shorter than the reference time, the server judges that the target device is within its home network. This verification of the target device using time is hereafter referred to as the "time verification". The time verification is based on the fact that a device external to the home network is typically connected to the server not only via the router in the home network but also via an Internet service provider (ISP), and accordingly, the target time for such an external device is longer than the target time for a device within the home network.

Further, the server verifies whether the target device is authentic, using authentication data attached to each of the echo-request data and the echo-reply data. This verification of the target device using authentication data is hereafter referred to as the "authenticity verification". Due to this, content can be protected against spoofing by an unauthorized device.

Finally, the server determines whether the target device belongs to the AD, based on results of the time verification and the authenticity verification.

It should be noted here that echo-request data and echo-reply data are transmitted and received by Ping (Packet INternet Groper) using the Internet Control Message Protocol (ICMP). Ping is a program for checking the availability of a device connected to a network. The ICMP is a communication protocol defined by IETF RFC792.

<Construction>

Figure 1:
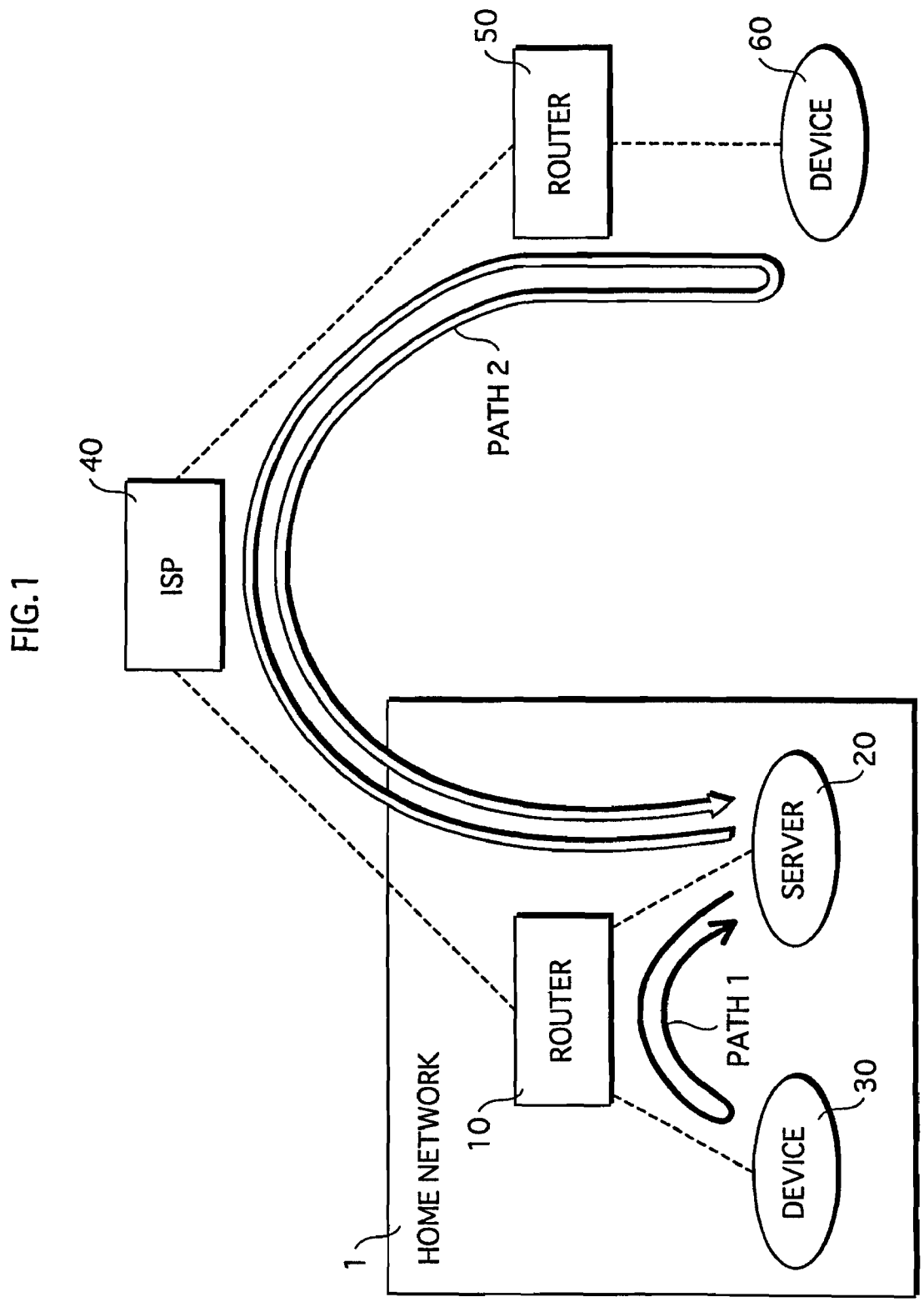
FIG. 1 shows the network construction relating to a first embodiment of the present invention.

FIG. 1 shows the network construction relating to the first embodiment of the present invention.

A home network 1 includes a router 10, a server 20, and a device 30. The home network 1 has the network construction in which the server 20 and the device 30 are star-connected via the router 10. It should be noted here that devices other than the device 30 may also be connected to the router 10, but those are not shown, for simplification of the drawing.

Within the home network 1, the router 10 is the only device connected to an external network, i.e., an ISP 40. The ISP 40 can be assumed as a router group composed of a plurality of routers. The server 20 and a device 60 are connected via the router 10, the ISP 40, and a router 50.

The server 20 stores various pieces of content. The server 20 receives a request to distribute a piece of content (hereafter, a "content distribution request") from a device via the router 10. Only when judging that the device that has transmitted the request belongs to the AD, the server 20 distributes the requested piece of content to the device. In the first embodiment, the device belonging to the AD is defined as an "authentic device within the home network 1".

To judge whether a target device belongs to the AD, the present embodiment employs the two processes, namely, the time verification and the authenticity verification. For the time verification, the server 20 transmits echo-request data to the target device, measures, as the target time, the time required between (a) transmitting the echo-request data and (b) receiving echo-reply data corresponding to the transmitted echo-request data from the target device, and compares the target time with the reference time that is set in advance. When the target time is equal to or shorter than the reference time, the server 20 judges that the target device is within its home network. For the authenticity verification, the server 20 attaches authentication data to the echo-request data and the echo-reply data, and judges whether the target device is authentic using the authentication data. Based on the verification results of the two processes, the server 20 finally determines whether the target device belongs to the AD.

The server 20 is specifically a computer system including a microprocessor, a ROM, a RAM, a hard disk unit, and a display unit. The ROM or the hard disk unit stores computer programs. The above functions of the server 20 are realized by the microprocessor operating in accordance with the computer programs.

The device 30 and the device 60 may be home appliances having the function of establishing connection to a network and obtaining various pieces of content via the network.

As shown in FIG. 1, when the device 30 is the target device, echo-request data and echo-reply data are transmitted on path 1. Assuming that the processing time is 100 μs (microseconds) for every routing by the router 10 and 200 μs for every ping by the device 30, the total time required for transmission of the echo-request data and the echo-reply data on path 1 (hereafter, the "total transmission time") is about 400 μs.

On the other hand, when the device 60 is the target device, echo-request data and echo-reply data are transmitted on path 2. Because the ISP 40 is composed of a plurality of routers executing such processing as filtering, the total transmission time on path 2 is as long as several ms (milliseconds).

As one example, the server 20 may have the reference time set in advance as 1 ms. In this case, with the total transmission time on path 1 being shorter than the reference time, the server 20 can judge that the device 30 is within the home network 1. With the total transmission time on path 2 being longer than the reference time, the server 20 can judge that the device 60 is external to the home network 1.

The following describes in detail the server and the device realizing the above functions.

Figure 2:
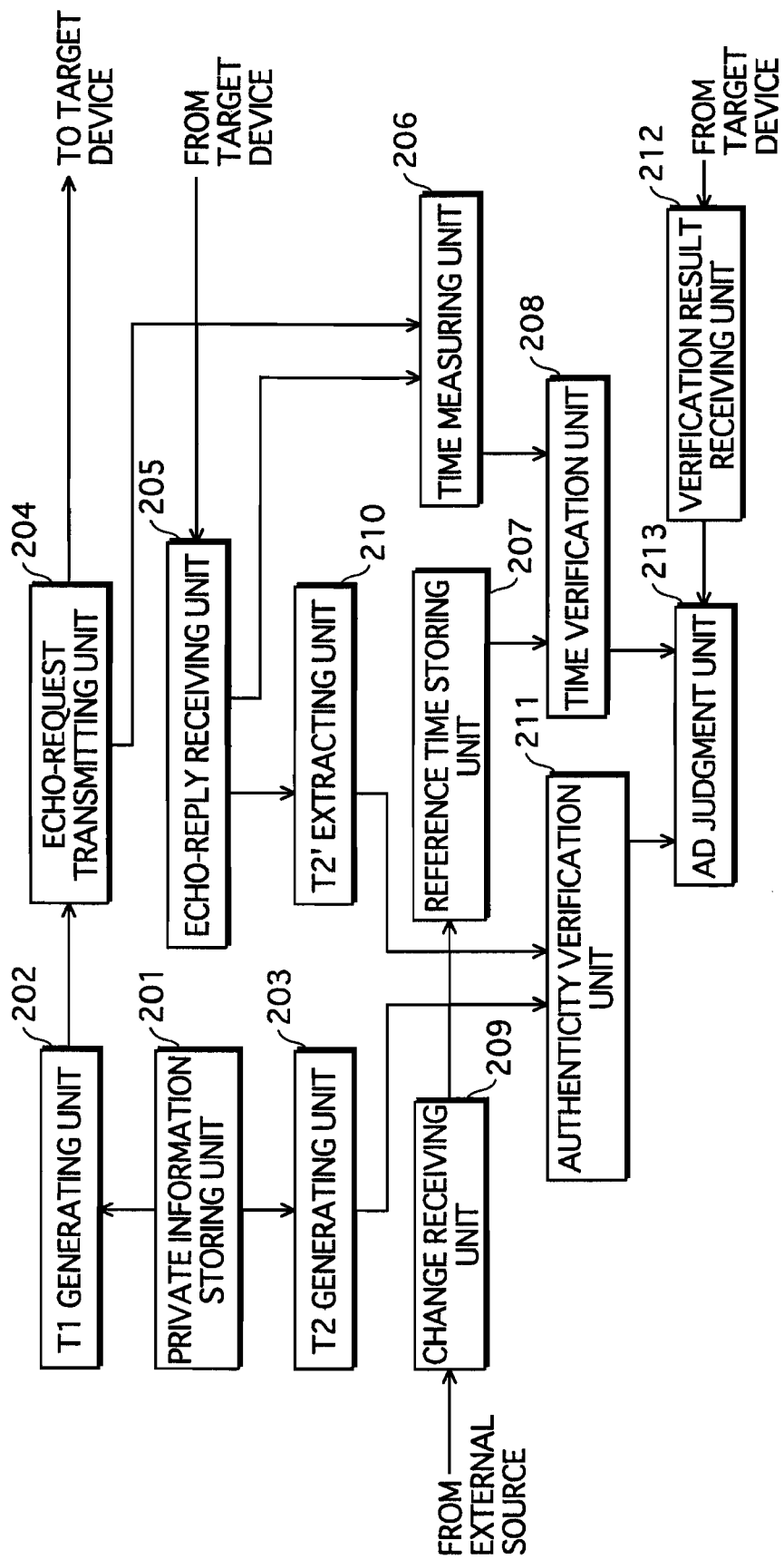
FIG. 2 shows the construction of a server relating to the first embodiment.

FIG. 2 shows the construction of the server relating to the first embodiment.

The server includes a private information storing unit 201, a T1 generating unit 202, a T2 generating unit 203, an echo-request transmitting unit 204, an echo-reply receiving unit 205, a time measuring unit 206, a reference time storing unit 207, a time verification unit 208, a change receiving unit 209, a T2' extracting unit 210, an authenticity verification unit 211, a verification result receiving unit 212, and an AD judgment unit 213.

The private information storing unit 201 stores private information KS common to the target device. As one example, a session key obtained after successful challenge-response authentication between the server and the target device may be used as the private information KS. The sharing of a session key can be realized in the following way.

(1) The server and the target device each hold a pair of public and private keys and a certificate for public key cryptography.

(2) The server generates a random number An, and transmits the generated random number as challenge data to the target device. The target device generates signature data using the random number An and its private key, and transmits the signature data and the certificate as response data, to the server.

(3) The server first verifies the authenticity of the public key of the target device using the certificate, and then verifies the authenticity of the response data using the public key, for the purpose of verifying the authenticity of the target device. In the same manner, the target device verifies the authenticity of the server.

(4) Further, the server and the target device share a session key, using such a key sharing method as the Diffie-Hellman (DH) key exchange. The method for sharing a session key should not be limited to the DH key exchange. The challenge-response authentication, the public key cryptography, the signature method, and the DH key exchange are described in detail, for example, in Tatsuaki Okamoto & Hirosuke Yamamoto, "*Gendai Ango* (Modern Cryptography)", Sangyo Tosho, 1997. The challenge-response authentication is described on page 151, the public key cryptography on page 107, the signature method on page 171, and the DH key exchange on page 200.

The T1 generating unit 202 generates authentication data T1 using the private information Ks. As the authentication data T1, an encrypted random number An may be used. The encrypted random number An is generated by encrypting, using the private information Ks, the random number An used in the above sharing of the session key.

The T2 generating unit 203 generates authentication data T2, which is different from the authentication data T1, using the private information KS. As the authentication data T2, data generated by encrypting, using the private information Ks, a value obtained by adding 1 to the random number An may be used.

The echo-request transmitting unit 204 attaches the authentication data T1 to echo-request data, and transmits the echo-request data to which the authentication data T1 is attached, to the target device.

The echo-reply receiving unit 205 receives echo-reply data from the target device.

The time measuring unit 206 measures, as the target time, the time required between (a) the transmission of the echo-request data by the echo-request transmitting unit 204 and (b) the reception of the echo-reply data by the echo-reply receiving unit 205.

The reference time storing unit 207 stores the reference time that has been set at the time of manufacture or shipment of the server.

The time verification unit 208 compares the target time measured by the time measuring unit 206 with the reference time stored in the reference time storing unit 207, to see if the target time is equal to or shorter than the reference time. To be more specific, the time verification unit 208 judges whether a value resulting from subtracting the reference time from the target time is a negative value or a positive value. When the resulting value is a negative value, the time verification unit 208 judges that the target device is within the home network 1. When the resulting value is a positive value, the time verification unit 208 judges that the target device is external to the home network 1.

In this way, the server can verify the target device, based on whether the target device is within the home network 1.

The change receiving unit 209 receives, from a specific computer or a specific storage medium external to the server, an instruction to change the reference time stored in the reference time storing unit 207. The change receiving unit 209 changes the reference time stored in the reference time storing unit 207 according to the received instruction. To prevent unauthorized access, it is preferable that the change receiving unit 209 verifies the authenticity of such an instruction by checking its signature or the like before changing the reference time.

The T2' extracting unit 210 extracts authentication data T2' attached to the echo-reply data received by the echo-reply receiving unit 205. Here, the authentication data T2' has been generated by the target device using the same method as the method used by the server to generate the authentication data T2.

The authentication data T2 and the authentication data T2', having been generated by the server and the target device respectively, should match if the target device is an authentic device that has the private information KS common to the server.

The authenticity verification unit 211 compares the authentication data T2 generated by the T2 generating unit 203 and the authentication data T2' extracted by the T2' extracting unit 210, to see if they match. In this way, the server can verify the target device, based on whether the target device is authentic.

In the same manner, the target device generates authentication data T1' and verifies the authenticity of the server using the authentication data T1 transmitted by the server as being attached to the echo-request data and the generated authentication data T1'.

The verification result receiving unit 212 receives a result of the authenticity verification performed by the target device.

The AD judgment unit 213 receives verification results from the time verification unit 208, the authenticity verification unit 211, and the verification result receiving unit 212, and judges whether the target device belongs to the AD, based on the received verification results.

To be more specific, when the time verification unit 208 judges that the target device is within the home network and the authenticity verification unit 211 judges that the target device is authentic, and the verification result receiving unit 212 receives the result indicating that the authenticity verification of the server is successful, the AD judgment unit 213 determines that the target device belongs to the AD.

Figure 3:
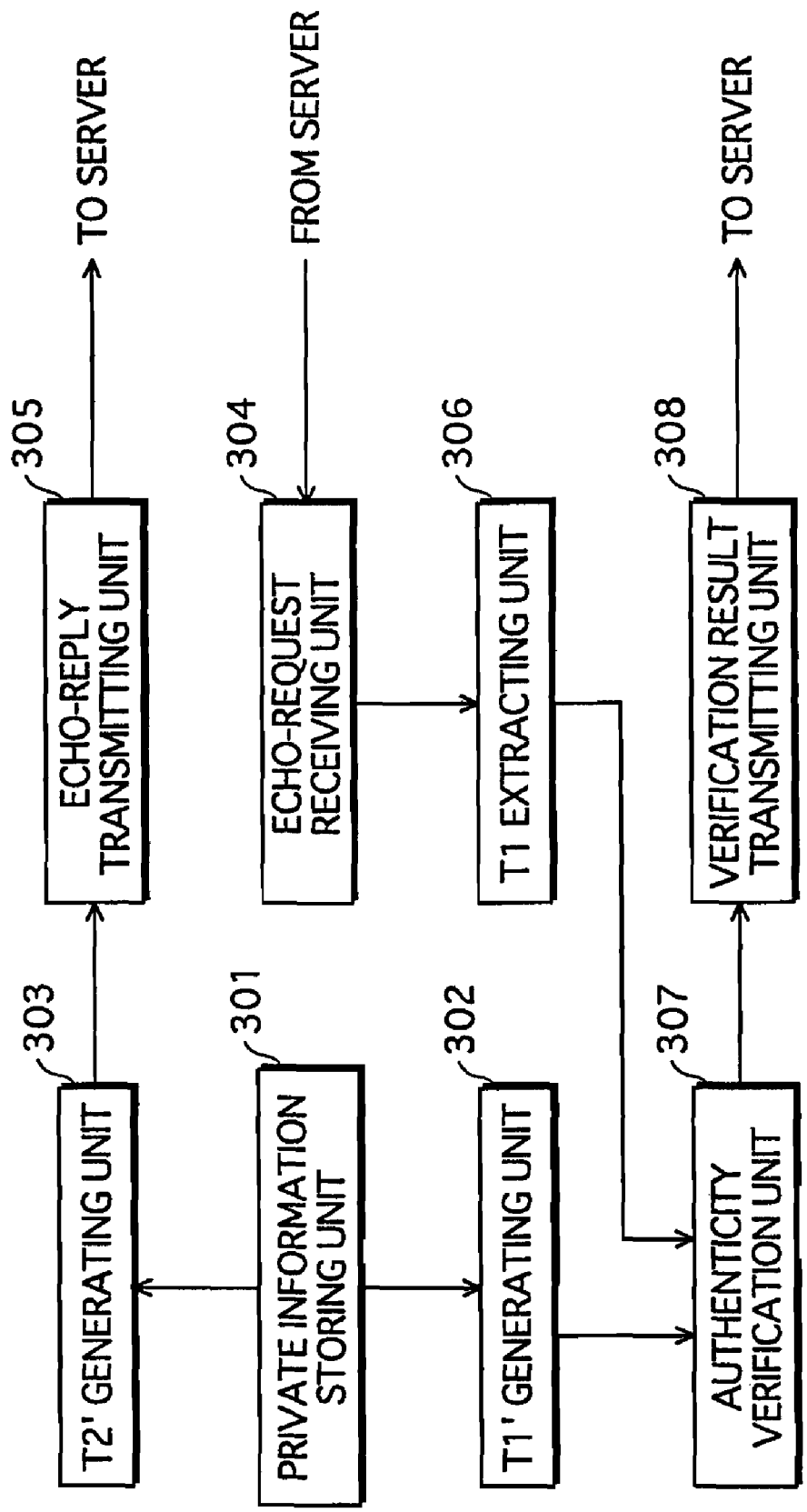
FIG. 3 shows the construction of a target device relating to the first embodiment.

FIG. 3 shows the construction of the target device relating to the first embodiment.

The target device includes a private information storing unit 301, a T1' generating unit 302, a T2' generating unit 303, an echo-request receiving unit 304, an echo-reply transmitting unit 305, a T1 extracting unit 306, an authenticity verification unit 307, and a verification result transmitting unit 308.

The private information storing unit 301 stores the private information Ks common to the server. The method for sharing the private information Ks is described above.

The T1' generating unit 302 generates authentication data T1' using the private information Ks. Here, the authentication data T1 is generated by the same method as the method used by the server to generate the authentication data T1.

The T2' generating unit 303 generates authentication data T2' using the private information Ks. Here, the authentication data T2' is generated by the same method as the method used by the server to generate the authentication data T2.

The echo-request receiving unit 304 receives echo-request data from the server.

The echo-reply transmitting unit 305 executes processing for a ping (hereafter, "ping processing"). To be more specific, the echo-reply transmitting unit 305 transmits, to the server 20, echo-reply data corresponding to the echo-reply data received by the echo-request receiving unit 304. It should be noted here that the authentication data T2' generated by the T2' generating unit 303 is attached to the echo-reply data.

The T1 extracting unit 306 extracts the authentication data T1 attached to the echo-reply data received by the echo-reply receiving unit 304.

The authenticity verification unit 307 compares the authentication data T1' generated by the T1' generating unit 302 and the authentication data T1 extracted by the T1 extracting unit 306 to see if they match. In this way, the target device can verify the server based on whether the server is authentic.

The verification result transmitting unit 308 transmit a result of the authenticity verification performed by the authenticity verification unit 307, to the server 20.

<Operations>

For content distribution to the target device, the server (A) receives a content distribution request (i.e., a request to judge whether the target device belongs to the AD) from the target device, (B) judges whether the target device is an authentic device within the home network (the AD judgment process), and (C) when the result of the AD judgment process is affirmative, distributes the requested piece of content. The following describes (B) the AD judgment process in detail.

Figure 4:
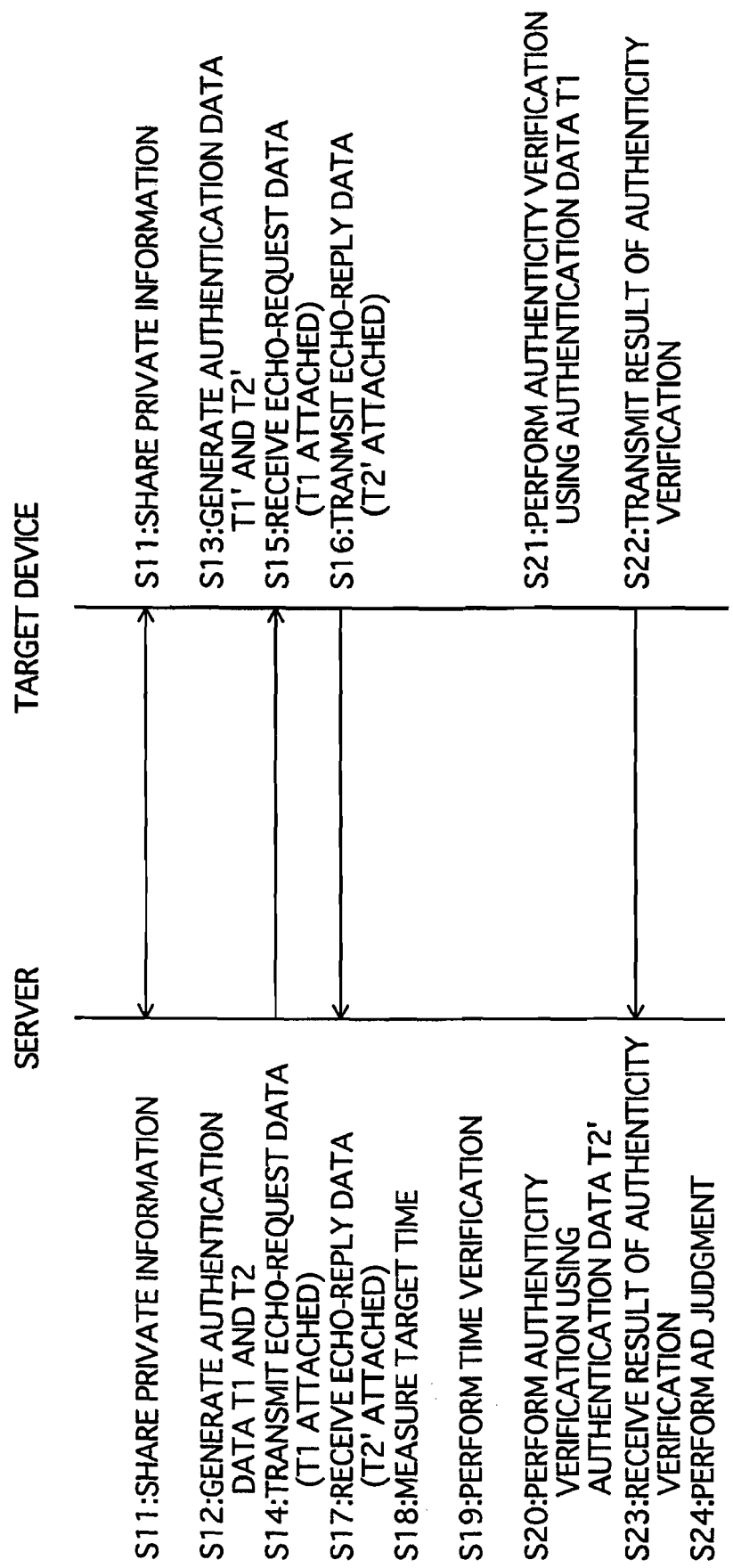
FIG. 4 shows the operations of the server and the target device relating to the first embodiment.

FIG. 4 shows the operations of the server and the target device relating to the first embodiment.

Step S11: The server and the target device are assumed to share the private information KS. The method for sharing the private information KS is described above.

Step S12: The server generates authentication data T1 and authentication data T2 using the private information Ks.

Step S13: The target device generates authentication data T1' and authentication data T2' using the private information KS. Having been generated using the same method, the authentication data T1' and the authentication data T1 should match. Having been generated using the same method, the authentication data T2' and the authentication data T2 should match.

It should be noted here that step S13 may be executed in parallel with step S12.

Step S14: The server attaches the authentication data T1 to echo-request data, and transmits the echo-request data to which the authentication data T1 has been attached, to the target device.

Step S15: The target device receives the echo-request data from the server.

Step S16: The target device attaches the authentication data T2' to echo-reply data corresponding to the echo-request data, and transmits the echo-reply data to which the authentication data T2' has been attached, to the server.

Step S17: The server receives the echo-reply data from the target device.

Step S18: The server measures, as the target time, the time required between transmitting the echo-request data in step S14 and receiving the echo-reply data in step S17.

Step S19: The server compares the target time measured in step S18 with the reference time set in advance, to see if the target time is equal to or shorter than the reference time. When the target time is equal to or shorter than the reference time, the server judges that the target device is within the home network.

Step S20: The server compares the authentication data T2 generated in step S12, and the authentication data T2' attached to the echo-reply data received in step S17, to see if they match. When the authentication data T2 and the authentication data T2' match, the server judges that the target device is authentic.

Step S21: The target device compares the authentication data T1' generated in step S13, and the authentication data T1 attached to the echo-request data received in step S15, to see if they match. When the authentication data T1' and the authentication data T1 match, the target device judges that the server is authentic.

Step S22: The target device transmits a result of the authenticity verification performed in step S21 to the server.

Step S23: The server receives the result of the authenticity verification transmitted from the target device in step S22.

Step S24: The server judges whether the target device belongs to the AD, based on the result of the time verification in step S19, the result of the authenticity verification in step S20 and the result of the authenticity verification received in step S23.

To be more specific, when the target device is judged to be within the home network in step S19 and the target device is judged to be authentic in step S20, and further, the result indicating that the authenticity verification of the server is successful is received in step S23, the server determines that the target device belongs to the AD.

As described above, the server can judge whether the target device belongs to the AD, based on the results of its time verification and authenticity verification, and the result of the authenticity verification performed by the target device.

This means that the server can judge whether the target device belongs to the AD without relying on the user. The server does not require the user to manually register devices belonging to the AD, thereby reducing burdens on the user. Moreover, the server can prevent the user from registering an unauthorized device not belong to the AD.

Also, the server can perform the time verification and the authenticity verification together, by attaching the authentication data to the echo-request data and the echo-reply data. This reduces the burdens on the network, compared with the case where the time verification and the authenticity verification are performed one after another.

The present embodiment employs the protocol where the target device generates the authentication data before receiving the echo-request data (see steps S13 and 15 in FIG. 4). If the authentication data can be generated at such a high speed that enables its generation time negligible within the target time, the protocol may alternatively be such that the target device generates the authentication data after receiving the echo-request data and then transmits echo-reply data to which the authentication data is attached.

Also, the present embodiment employs the protocol where the target device performs the authenticity verification after transmitting the echo-reply data (see step S21 in FIG. 4). If the authenticity verification can be preformed at such a high speed that enables the authenticity-verification time negligible within the target time, the protocol may alternatively be such that the target device performs the authenticity verification after reception of the echo-request data and before transmission of the echo-reply data, and transmits the result of the authenticity verification as being attached to the echo-reply data.

Also, although the present embodiment describes the case where the authenticity verification is performed by both the server and the target device, it may be performed by only one of the server and the target device.

Second Embodiment

<Outline>

In the second embodiment of the present invention, the server selects a value of the reference time with which the target time is to be compared, according to mediums via which the server and the target device are connected to the network. Examples of such connecting mediums include cabling 100Base (defined by IEEE802.3), wireless IEEE802.11a and IEEE802.11b, and powerline communication HomePlug.

The time required between the transmission of echo-request data and the reception of echo-reply data differs depending on whether connecting mediums used for the server and the target device are cable or wireless, and further depending on the specifications with which these connecting mediums comply. In the second embodiment, therefore, the server selects a value of the reference time according to the connecting mediums used for the server and the target device, for the purpose of enabling more accurate judgment as to whether the target device is within the home network.

<Construction>

Figure 5:
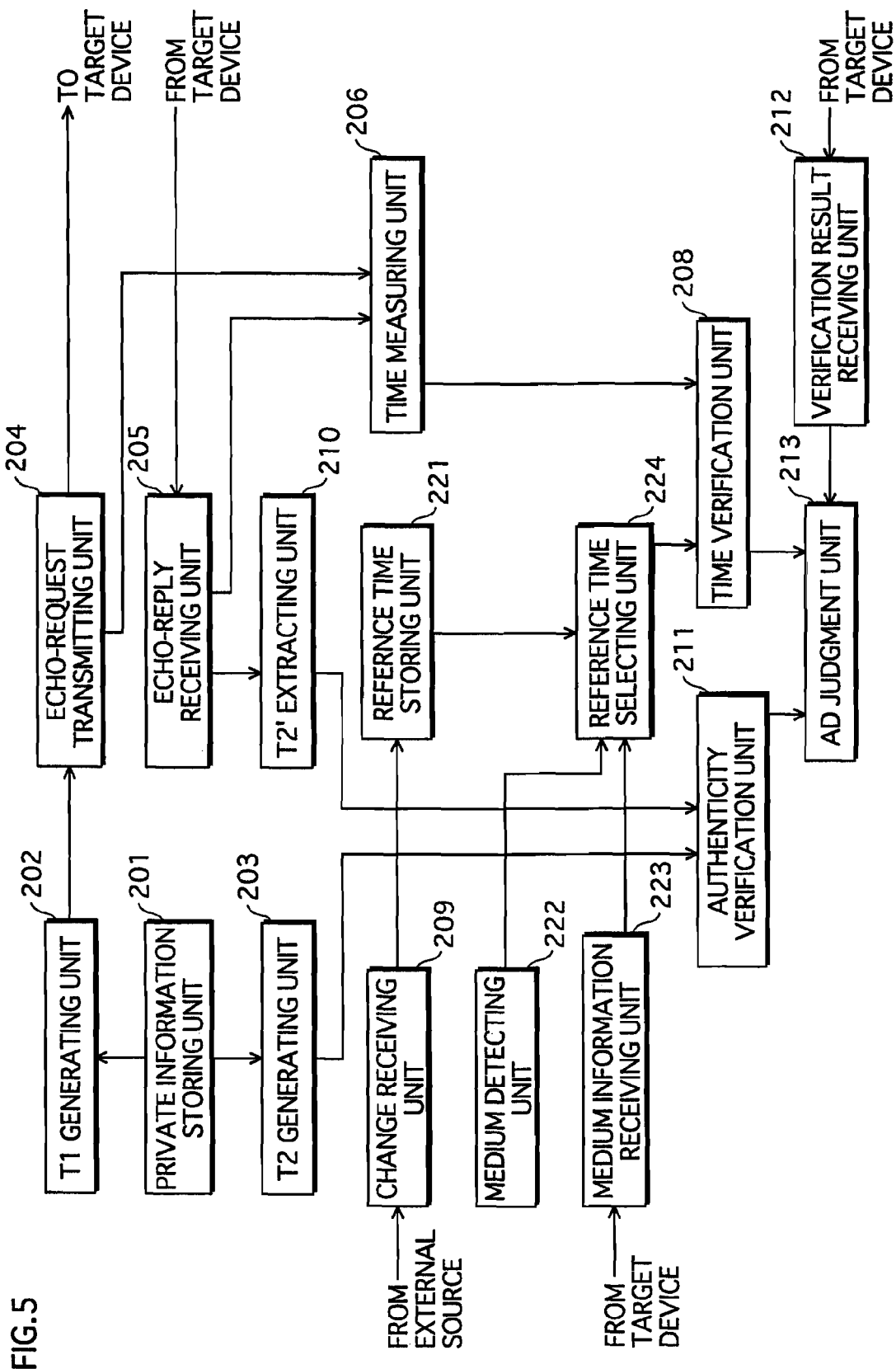
FIG. 5 shows the construction of a server relating to a second embodiment of the present invention.

FIG. 5 shows the construction of the server relating to the second embodiment of the present invention.

The server includes a private information storing unit 201, a T1 generating unit 202, a T2 generating unit 203, an echo-request transmitting unit 204, an echo-reply receiving unit 205, a time measuring unit 206, a reference time storing unit 221, a time verification unit 208, a change receiving unit 209, a T2' extracting unit 210, an authenticity verification unit 211, a verification result receiving unit 212, an AD judgment unit 213, a medium detecting unit 222, a medium information receiving unit 223, and a reference time selecting unit 224.

The server relating to the second embodiment has the same construction as the server relating to the first embodiment except that the reference time storing unit 221, the medium detecting unit 222, the medium information receiving unit 223, and the reference time selecting unit 224 are additionally provided. Accordingly, the second embodiment is described focusing only on these additionally provided components. The same components of the server relating to the second embodiment as the components provided in the first embodiment are not described.

The reference time storing unit 221 stores a plurality of values of the reference time. Each value corresponds to a different combination of a first connecting medium used for the server and a second connecting medium used for the target device.

The medium detecting unit 222 detects the first connecting medium used for the server. As one example, the medium detecting unit 222 may physically detect connection of a cable to a connector supporting the IEEE802.3 provided in the server.

The medium information receiving unit 223 receives medium information from the target device. The medium information indicates the second connecting medium used for the target device.

The reference time selecting unit 224 selects a value of the reference time, out of a plurality of values stored in the reference time storing unit 221, according to a combination of the first connecting medium detected by the medium detecting unit 222 and the second connecting medium obtained by the medium information receiving unit 223.

The time verification unit 208 judges whether the target time is equal to or shorter than the reference time, using the value selected by the reference time selecting unit 224.

FIG. 6 shows examples of a plurality of values of the reference time stored in the reference time storing unit 221.

In the figure, three specifications: 100Base; IEEE802.11a; and IEEE802.11b are set as candidates for the specification of the first connecting medium. The three of specifications are also set as candidates for the specification of the second connecting medium. According to each candidate for the combination of the first connecting medium and the second connecting medium, three values of the reference time "Ref1", "Ref2", and "Ref3" are registered.

The reference time "Ref1" is to be used when both the first connecting medium and the second connecting medium comply with 100Base. As one example, the reference time "Ref1" is 1 ms (or a value little smaller than this).

The reference time "Ref2" is to be used when both the first connecting medium and the second connecting medium comply with IEEE802.11a. As one example, the reference time "Ref2" is 2 ms.

The reference time "Ref3" is to be used when both the first connecting medium and the second connecting medium comply with IEEE802.11b. As one example, the reference time "Ref3" is 3 ms.

It should be noted here that when the first connecting medium and the second connecting medium comply with different specifications, a larger one of values of the reference time set for the different specifications is to be selected. This is due to the following reason.

For example, when the server is connected to the network via a wireless LAN specification (IEEE802.11a) of 5 GHz and the target device is connected to the network via a cabling LAN specification (100Base), a path for which the target time is to be measured includes a media converter for cable/wireless conversion. Due to the media converter, the target time here is substantially as long as the target time in the case when the server and the target device both comply with the IEEE802.11a.

It should be noted here that this selection of a value of the reference time is a mere example, and an appropriate value of the reference time is to be selected according to each form of connection.

Also, the above values of the reference time "Ref1", "Ref2", and "Ref3" may be changed according to an instruction given by the change receiving unit 209.

Figure 7:
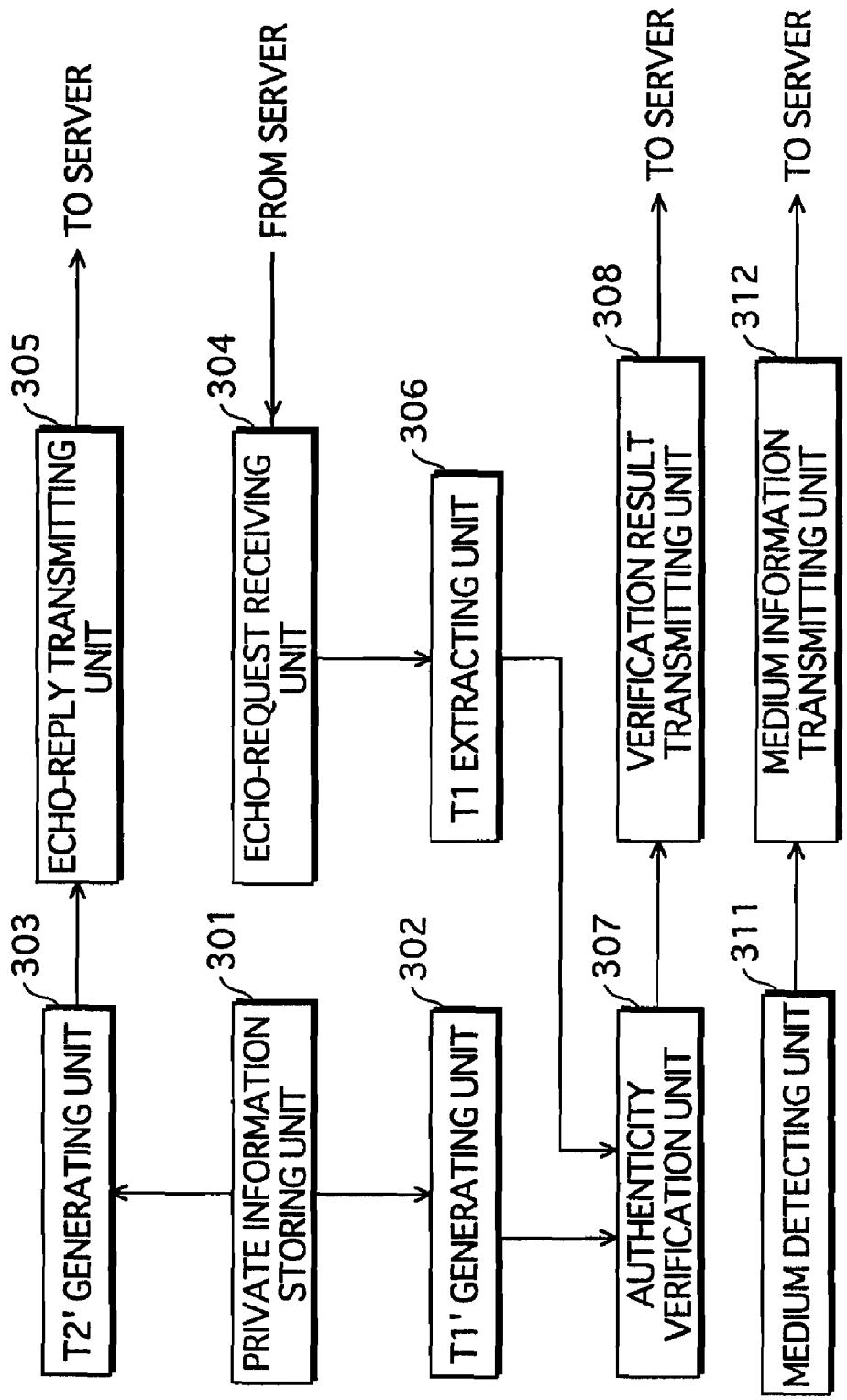
FIG. 7 shows the construction of a target device relating to the second embodiment.

FIG. 7 shows the construction of a device relating to the second embodiment.

The device relating to the second embodiment includes a private information storing unit 301, a T1' generating unit 302, a T2' generating unit 303, an echo-request receiving unit 304, an echo-reply transmitting unit 305, a T1 extracting unit 306, an authenticity verification unit 307, a verification result transmitting unit 308, a medium detecting unit 311, and a medium information transmitting unit 312.

The device relating to the second embodiment has the same construction as the device relating to the first embodiment except that the medium detecting unit 311 and the medium information transmitting unit 312 are additionally provided. Accordingly, the following only describes these additionally provided components, and the components of the device relating to the second embodiment that are the same as the components provided in the first embodiment are not described.

The medium detecting unit 311 detects the second connecting medium used for the target device. As one example, the medium detecting unit 311 may physically detect connection of a cable to a connector supporting IEEE802.3 provided in the target device.

The medium information transmitting unit 312 transmits medium information indicating the second connecting medium detected by the medium detecting unit 311 to the server.

<Operations>

The following describes the operations of the server with the above-described construction for executing the AD judgment process.

Figure 8:
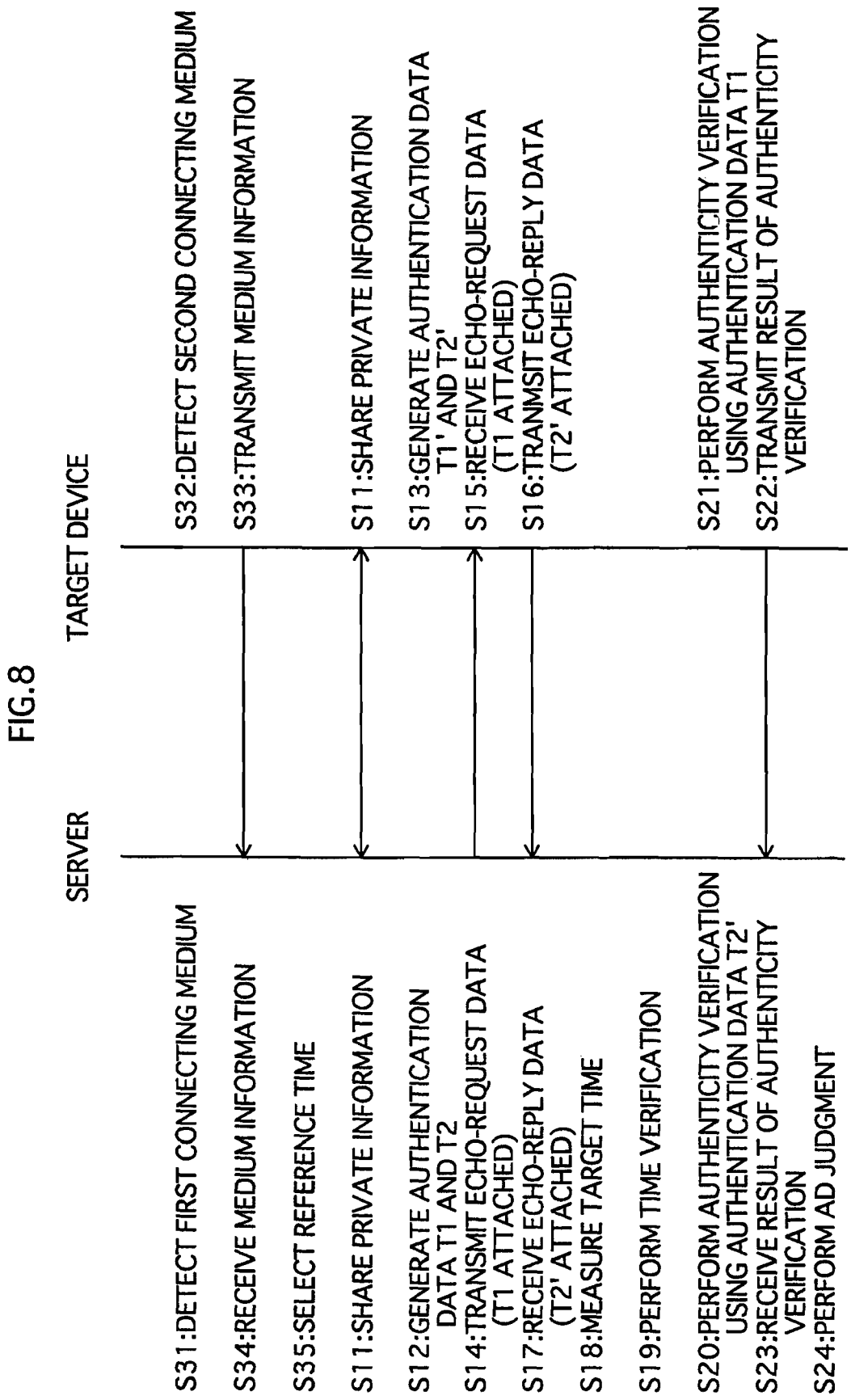
FIG. 8 shows the operations of the server and the target device relating to the second embodiment.

FIG. 8 shows the operations of the server and the target device relating to the second embodiment.

Step S31: The server detects its first connecting medium.

Step S32: The target device detects its second connecting medium.

Step S33: The target device transmits medium information indicating the second connecting medium detected in step S32.

Step S34: The server receives the medium information from the target device.

Step S35: The server selects a value of the reference time, out of a plurality of values, according to a combination of the first connecting medium detected in step S31 and the second connecting medium obtained using the medium information.

The subsequent steps are the same as those in the first embodiment, and therefore are not described.

As described above, the server can select a value of the reference time according to the connecting mediums used for the server and the target device. In this way, the server can judge more accurately whether the target device is within its home network.

Although the second embodiment describes the case where a value of the reference time is selected based on both the connecting medium used for the server and the connecting medium used for the target device, the selection may be made based on the connecting medium of one of the server and the target device. This can be applied to the case where a media converter is not permitted to be provided on the communication path.

Although the second embodiment describes the case where a value of the reference time is selected based on the connecting mediums used for the server and the target device, the present invention should not be limited to such. A value of the reference time may be selected based on copy control information or priority information attached to each piece of content. Here, copy control information may specifically be two-bit information, such as "00" indicating "Copy Free", "01" indicating "No More Copy", "10" indicating "Copy One Generation", and "11" indicating "Copy Never".

It should be noted here that the home network realized by wireless communication may be in an instruction mode or in an ad hoc mode. In the instruction mode, the communication is made via an access point (here, via a router). In the ad hoc mode, the communication is directly made without via an access point. The communication in the ad hoc mode is possible only when the server and the target device are positioned within a transmission range of their radio waves. Therefore, the server can judge that the target device is within its home network when the target device in communicable in the ad hoc mode. Accordingly, when the medium detecting units of both the server and the target device detect their connecting mediums as wireless and the server finds that the target device is communicable in the ad hoc mode, the server may select an infinite value for the reference time, so that the time verification unit 208 can always judge that the target device is within the home network regardless of the target time.

Alternatively, the server may skip the time verification when the connecting mediums are detected as wireless and the communication mode is detected as the ad hoc mode.

Third Embodiment

<Outline>

In the third embodiment of the present invention, the server and the target device simultaneously transmit data for time measurement (hereafter, "measurement data"), with its destination being set as the server. The server compares (a) the time required to transmit the data from the target device to the server (the target time), with (b) the round-trip time of the data between the server and a nearby router (the reference time). When a difference between the target time and the reference time is in a predetermined range, the server judges that the target device is within its home network.

In this way, the server obtains the reference time by actually transmitting measurement data on a reference path that is set in advance (here, "server-nearby router-server"). Due to this, the server can obtain the reference time determined depending on the communication traffic at the time of the AD judgment process. The server can therefore judge more accurately whether the target device is within its home network than in the case where the reference time is a fixed value.

It should be noted here that the authenticity verification performed in the present embodiment is the same as the authenticity verification described in the first embodiment, and therefore is not describe here. The following only describes the time verification performed in the present embodiment.

<Construction>

Figure 9:
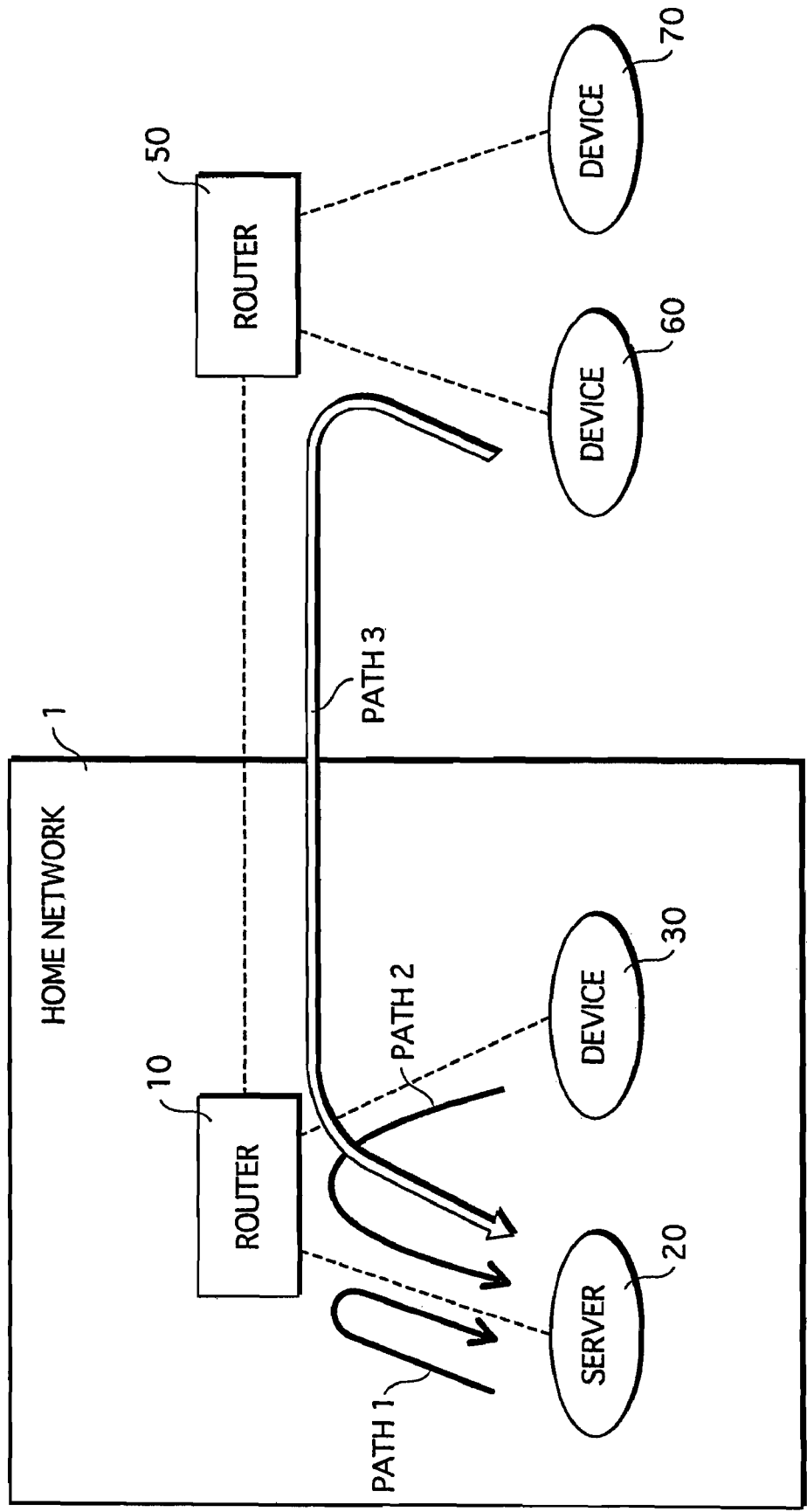
FIG. 9 shows the network construction relating to a third embodiment of the present invention.

FIG. 9 shows the network construction relating to the third embodiment of the present invention.

The network construction relating to the third embodiment differs from that of the first embodiment in that the router 10 and the router 50 are directly connected with each other without via an ISP.

The following describes the method employed by the server 20 for judging whether the target device is within its home network.

(1) The server 20 and the target device have their clocks synchronized in advance. The server 20 and the target device share common information about the transmission-start time at which transmission of measurement data is to be started.

(2) When the present time reaches the transmission-start time, the server 20 transmits first measurement data with its destination being set as the server 20, and the target device transmits second measurement data with its destination being set as the server 20. The first measurement data makes a round-trip between the server 20 and the router 10. The second measurement data is transmitted to the server 20 via the router 10.

(3) The server 20 receives the first measurement data and the second measurement data, and calculates the transmission time of the first measurement data and the transmission time of the second measurement data, based on the time of its reception and the transmission-start time. The server 20 then compares the transmission time of the first measurement data and the transmission time of the second measurement data. Here, the transmission time of the first measurement data is assumed to be the reference time, and the transmission time of the second measurement data is assumed to be the target time.

(4) When a difference between the reference time and the target time is in a predetermined range (e.g., in a range of 10% of the reference time), the server 20 judges that the target device is within its home network.

The total transmission time required to transmit measurement data on each path can be expressed as $$T1=2tsr+tr,$$

$$T2=tra+tr+tsr, \text{ and}$$

$$T3=trb+2tr+trr+tsr,$$

where "T1" is the total transmission time on path 1 (server 20-router 10-server 20), "T2" is the total transmission time on path 2 (device 30-router 10-server 20), and "T3" is the total transmission time on path 3 (device 60-router 50-router 10-server 20), and "tsr" is the transmission time between the server 20 and the router 10, "tra" is the transmission time between the router 10 and the device 30, "tr" is the time required for routing processing by the router 10 and the router 50, "trr" is the transmission time between the router 10 and the router 50, and "trb" is the transmission time between the router 50 and the device 60.

Assuming that tsr=tra=trb=trr, $$T1=2tsr+tr,$$

$$T2=2tsr+tr, \text{ and}$$

$$T3=3tsr+2tr.$$

The total transmission time is the same on path 1 and path 2, but is different on path 3.

Here, the network is assumed to comply with 10 Base (with a transmission speed of 100 Mbps), and the size of the measurement data is assumed to be about 100 bytes, considering a relatively small size of its user data.

Based on the above assumption, the transmission time (tsr, tra, trb, and trr) between neighboring devices among the server 20, the router 10, the device 30, and the device 60 is uniformly 8 µs.

The time required for routing processing by the router 10 or the router 50 is about 100 µs when the routing processing is executed by software.

In this case, the total transmission time is

116 µs on path 1,

116 µs on path 2, and

224 µs on path 3.

When the target device is the device 30, the server 20 obtains the target time of 116 µs against the reference time of 116 µs. When the target device is the device 60, the server 20 obtains the target time of 224 µs against the reference time of 116 µs.

The server 20 compares the reference time and the target time, and when a difference between the reference time and the target time is in a predetermined range (e.g., in a range of 10' of the reference time), judges that the target device is within the home network. The predetermined range here is to be such a range that enables judgment as to whether the communication path connecting the server and the target device includes one router, or a plurality of routers.

It should be noted here that the router 10 and the router 50 are usually connected via an ISP. In the case where the router 10 and the router 50 are connected via an ISP, a difference in the total transmission time between path 2 and path 3 is considered larger than in the case of the present embodiment.

The following describes in detail the construction and the operations of the server and the like realizing the above functions.

Figure 10:
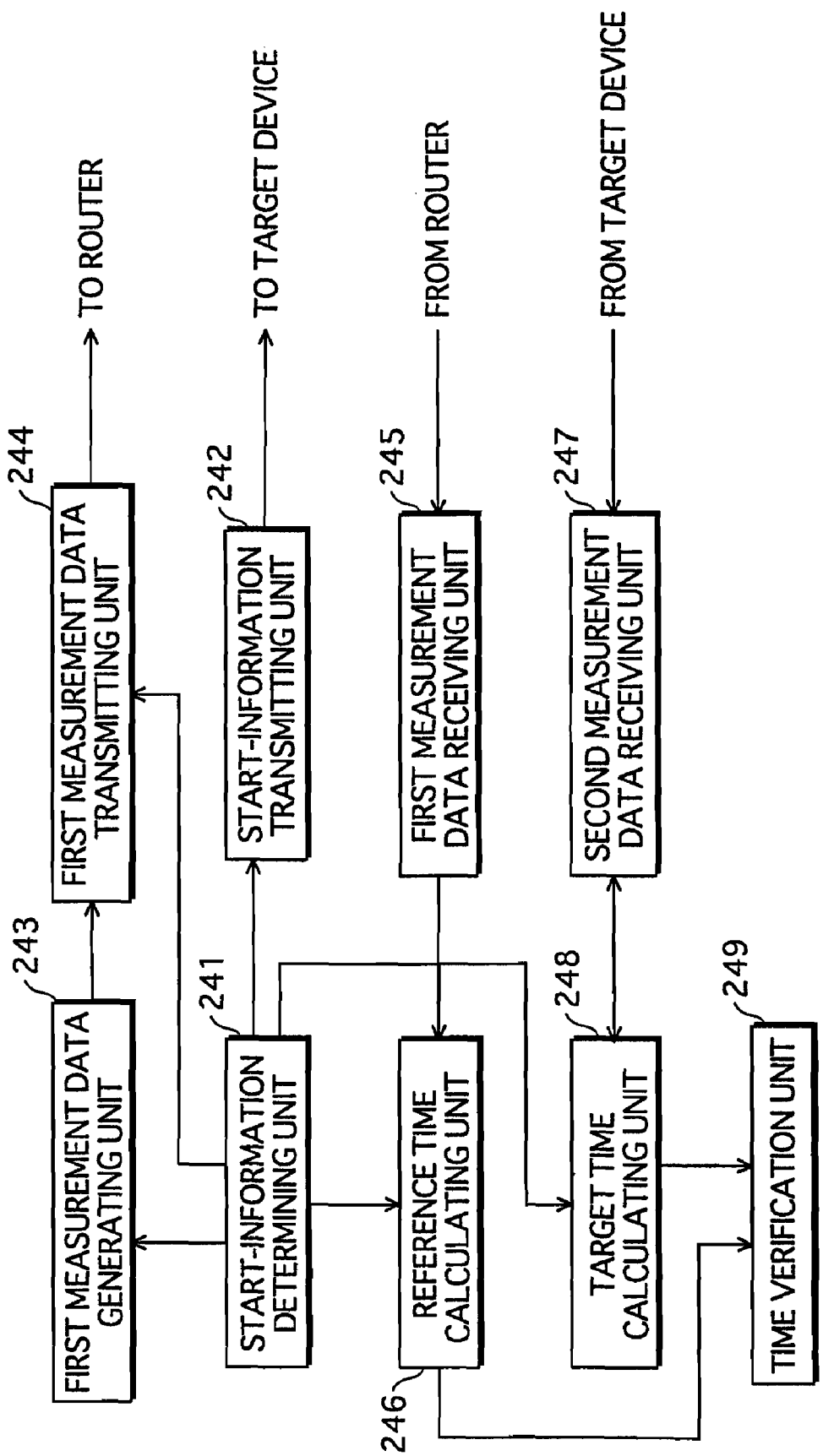
FIG. 10 shows the construction of a server relating to the third embodiment.

FIG. 10 shows the construction of the server relating to the third embodiment.

The server includes a start information determining unit 241, a start information transmitting unit 242, a first measurement data generating unit 243, a first measurement data transmitting unit 244, a first measurement data receiving unit 245, a reference time calculating unit 246, a second measurement data receiving unit 247, a target time calculating unit 248, and a time verification unit 249.

The start information determining unit 241 determines the start time at which the AD judgment process is to be started, and an ID of the AD judgment process, when a content distribution request is given by the target device. It should be noted here that the server and the target device have their clocks synchronized in advance using the time synchronization service through radio waves or a network. The most frequently used time synchronization service through a network is now the Network Time Protocol (NTP). The latest version, i.e. NTP version 3, is standardized by RFC1305.

The start information transmitting unit 242 transmits the start time and the ID determined by the start information determining unit 241, to the target device.

The first measurement data generating unit 243 generates first measurement data. The structure of the first measurement data is described later.

The first measurement data transmitting unit 244 transmits the first measurement data to a router that is the nearest to the server (hereafter, a "nearby router") when the present time reaches the start time.

The first measurement data receiving unit 245 receives first measurement data that has made a round-trip between the first measurement data transmitting unit 244 and the router.

The reference time calculating unit 246 calculates, as the reference time, a time period between (a) the time at which the first measurement data is received by the first measurement data receiving unit 245 and (b) the start time.

The second measurement data receiving unit 247 receives the second measurement data that the target device transmits at the start time.

The target time calculating unit 248 calculates, as the target time, a time period between (a) the time at which the second measurement data is received by the second measurement data receiving unit 247 and (b) the start time.

The time verification unit 249 compares the target time calculated by the target time calculating unit 248 with the reference time calculated by the reference time calculating unit 246, and when a difference between the target time and the reference time is in a predetermined range (e.g., in a range of 10% of the reference time), the time verification unit 249 judges that the target device belongs to the home network.

Figure 11:
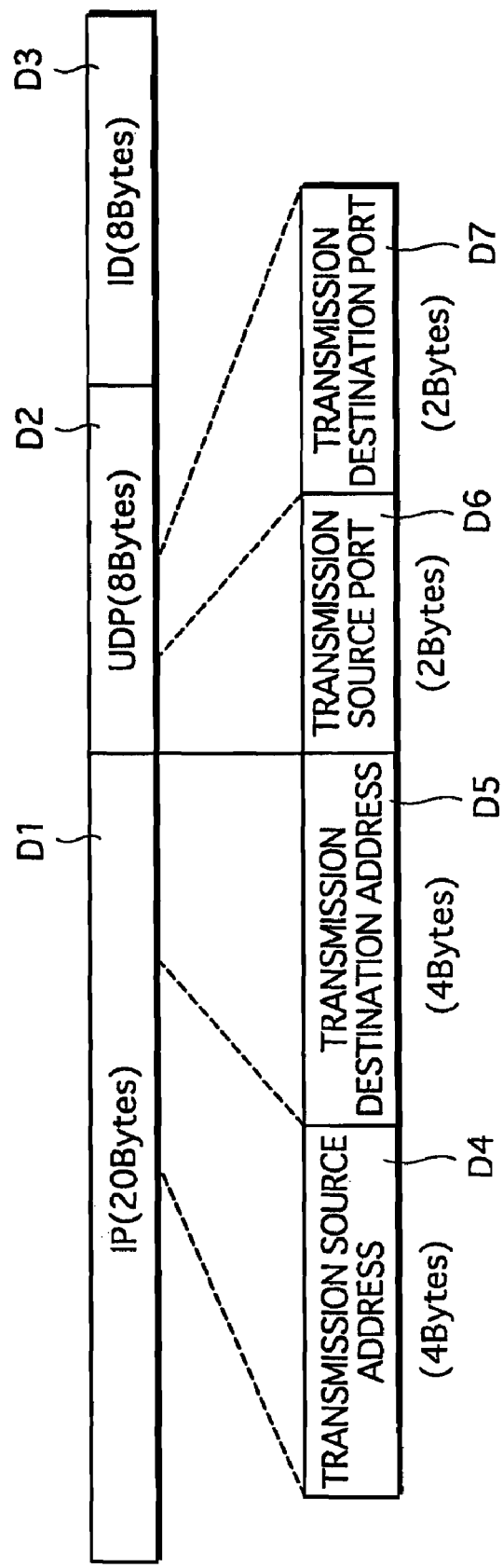
FIG. 11 shows the structure of data for time measurement.

FIG. 11 shows the structure of the measurement data.

The measurement data includes, as header information, an IP header "D1" with 20 bytes and a UDP header "D2" with 8 bytes, followed by a data part "D3". The IP header "D1" includes an IP address "D4" of a transmission source (with 4 bytes), and an IP address "D5" of a transmission destination (with 4 bytes).

For example, in the case of the first measurement data, an IP address of the server is set as both the transmission source address "D4" and the transmission destination address "D5". In the case of the second measurement data, an IP address of the device is set as the transmission source address "D4", and the IP address of the server is set as the transmission destination address "D5".

The UDP header "D2" includes a port number "D6" (with 2 bytes) of the transmission source, and a port number "D7" (with 2 bytes) of the transmission destination. Also, the data part "D3" stores an ID of the AD judgment process (e.g., with 8 bytes), and authentication data used for the authenticity verification. Upon receipt of measurement data, the server 20 identifies the received data as "measurement data", using the UDP included therein, and identifies which device has transmitted the measurement data and when the device has transmitted the measurement data, using the ID included therein. Here, the ID is assumed to have 8 bytes. However, the data size of the ID should not be limited to such, as long as the ID can contain appropriate information to be used by the server for the above purpose.

Figure 12:
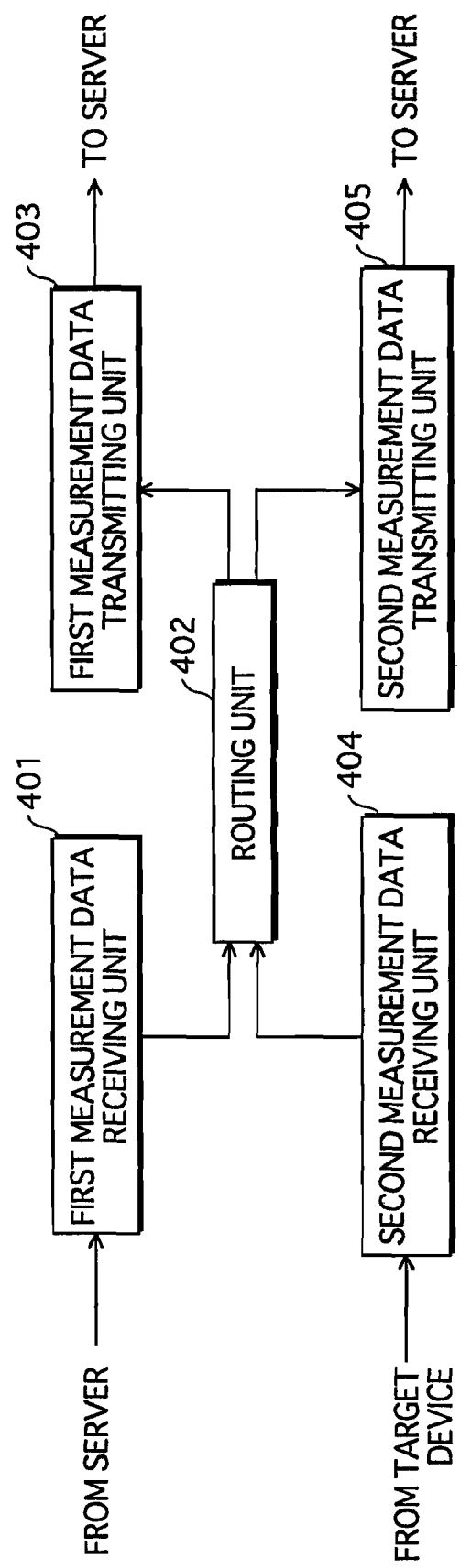
FIG. 12 shows the construction of a router relating to the third embodiment.

FIG. 12 shows the construction of the router relating to the third embodiment.

The router includes a first measurement data receiving unit 401, a routing unit 402, a first measurement data transmitting unit 403, a second measurement data receiving unit 404, and a second measurement data transmitting unit 405.

The first measurement data receiving unit 401 receives first measurement data transmitted from the server.

The routing unit 402 identifies transfer destinations of the first measurement data and the second measurement data respectively transmitted from the server and the target device, using IP addresses of the transfer destinations included therein. The first measurement data transmitting unit 403 transmits the first measurement data to the server that is identified as the transfer destination by the routing unit 402.

The second measurement data receiving unit 404 receives the second measurement data transmitted from the target device.

The second measurement data transmitting unit 405 transmits the second measurement data to the server identified as the transfer destination by the routing unit 402.

Figure 13:
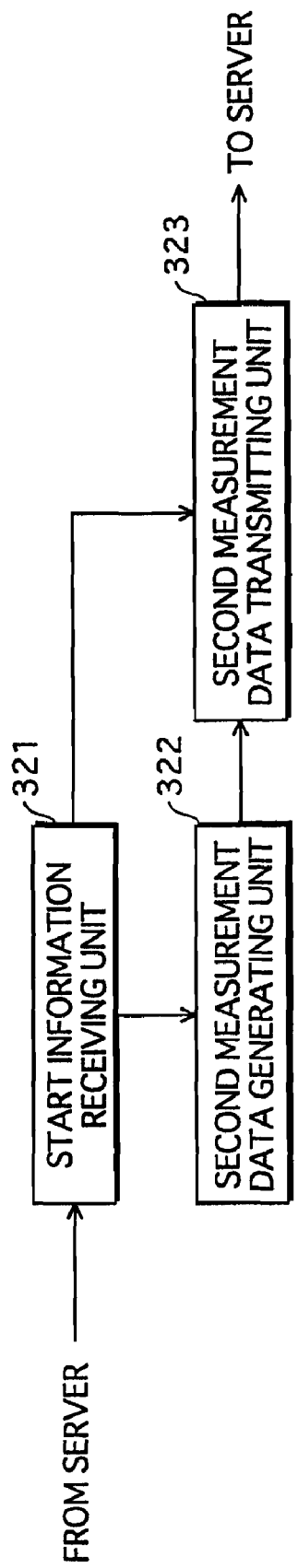
FIG. 13 shows the construction of a target device relating to the third embodiment.

FIG. 13 shows the construction of the target device relating to the third embodiment.

The target device includes a start information receiving unit 321, a second measurement data generating unit 322, and a second measurement data transmitting unit 323.

The start information receiving unit 321 receives the start time and the ID of the AD judgment process transmitted from the server.

The second measurement data generating unit 322 generates second measurement data. The structure of the measurement data is described above.

The second measurement data transmitting unit 323 transmits the second measurement data to the server when the present time reaches the start time.

<Operations>

The following describes the operations of the server with the above-described construction for executing the AD judgment process.

Figure 14:
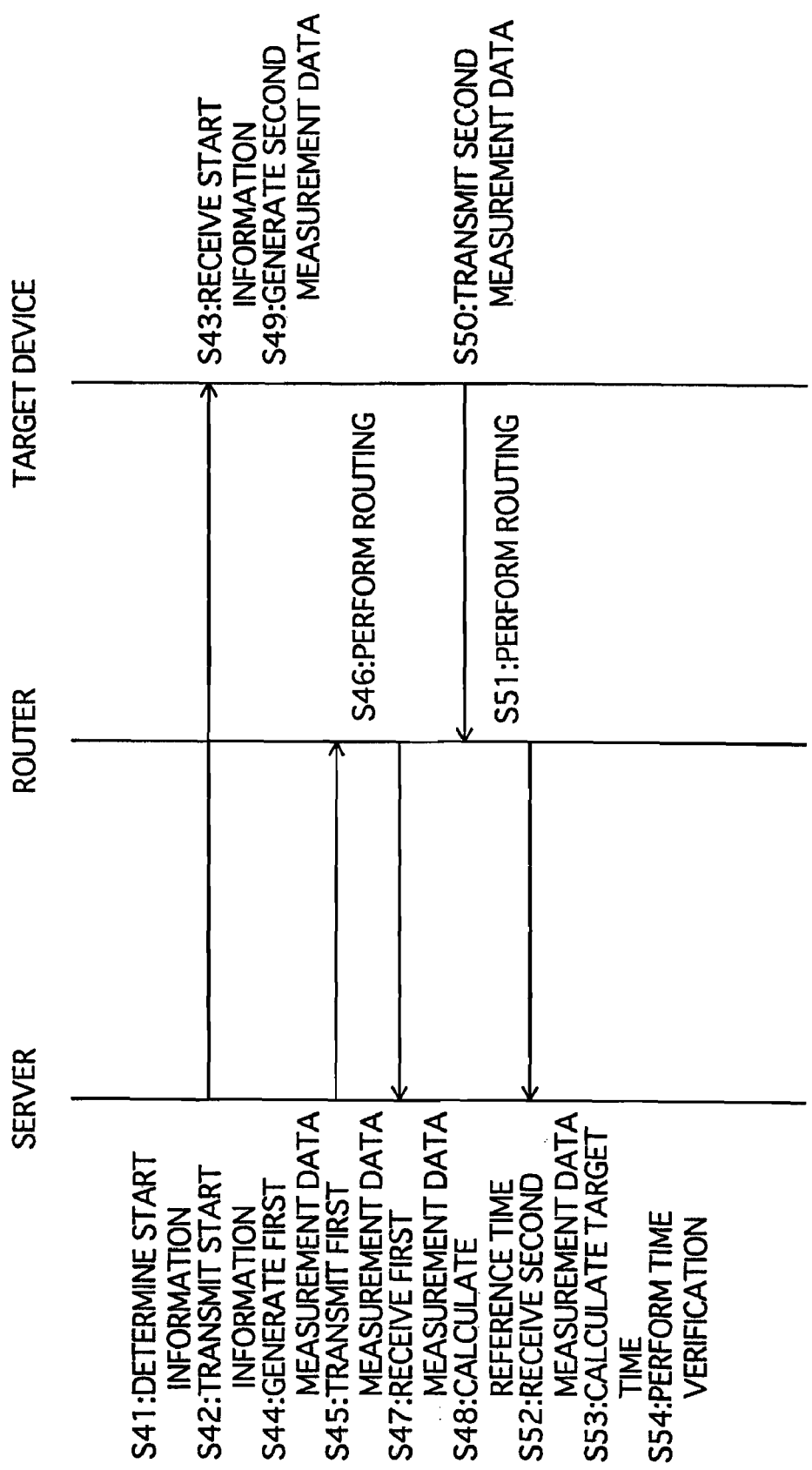
FIG. 14 shows the operations of the server, the router, and the target device relating to the third embodiment.

FIG. 14 shows the operations of the server, the router, and the target device relating to the third embodiment.

Step S41: The server determines the start time and the ID of the AD judgment process.

Step S42: The server transmits start information that is made up of the start time and the ID, to the target device.

Step S43: The target device receives the start information.

Step S44: The server generates first measurement data. It should be noted here that an ID is set for the first measurement data.

Step S45: The server transmits the first measurement data to the router when the present time reaches the start time determined in step S41.

Step S46: The router receives the first measurement data, and executes routing processing of the first measurement data, i.e., identifies the server that is the transmission destination and transmits the first measurement data to the server.

Step S47: The server receives the first measurement data from the router.

Step S48: The server calculates, as the reference time, a time period between (a) the time at which the first measurement data is received in step S47 and (b) the start time.

Step S49: The target device generates second measurement data. It should be noted here that an ID is set for the second measurement data.

Step S50: The target device transmits the second measurement data when the present time reaches the start time obtained in step S43.

Step S51: The router receives the second measurement data, and executes routing processing of the second measurement data, i.e., identifies the server that is the transmission destination and transmits the second measurement data to the server.

Step S52: The server receives the second measurement data from the router.

Step S53: The server calculates, as the target time, a time period between (a) the time at which the second measurement data is received in step S52 and (b) the start time.

Step S54: The server compares the target time calculated in step S52 with the reference time calculated in step S48, and when a difference between the target time and the reference time is in a predetermined range (e.g., in a range of 10% of the reference time), judges that the target device is within the home network.

As described above, the server can obtain the reference time determined depending on the communication traffic at the time of the AD judgment process. This is particularly effective, for example, in a network whose communication traffic greatly fluctuates.

With the reference time being a fixed value as in the first embodiment, misjudgment may occur when the communication traffic is extremely heavy at the time of the AD judgment process. To be specific, due to the heavy communication traffic, the target time measured for the target device within the home network may become longer than the reference time, thereby causing the misjudgment that the target device within the home network is external to the home network. According to the third embodiment, not only the target time but also the reference time are actually measured at the time of the AD judgment process. When the communication traffic is heavy, the reference time is set accordingly long, thereby eliminating such misjudgment.

Fourth Embodiment

In the fourth embodiment, the reference time is obtained by actually transmitting measurement data on a reference path set in advance, as in the third embodiment. In the fourth embodiment, however, Ping echo-request/echo-reply are used as the measurement data.

With the existing program Ping being used, a new program does not have to be developed for transmitting and receiving measurement data.

As in the third embodiment, the authenticity verification is not described in the present embodiment.

<Construction>

Figure 15:
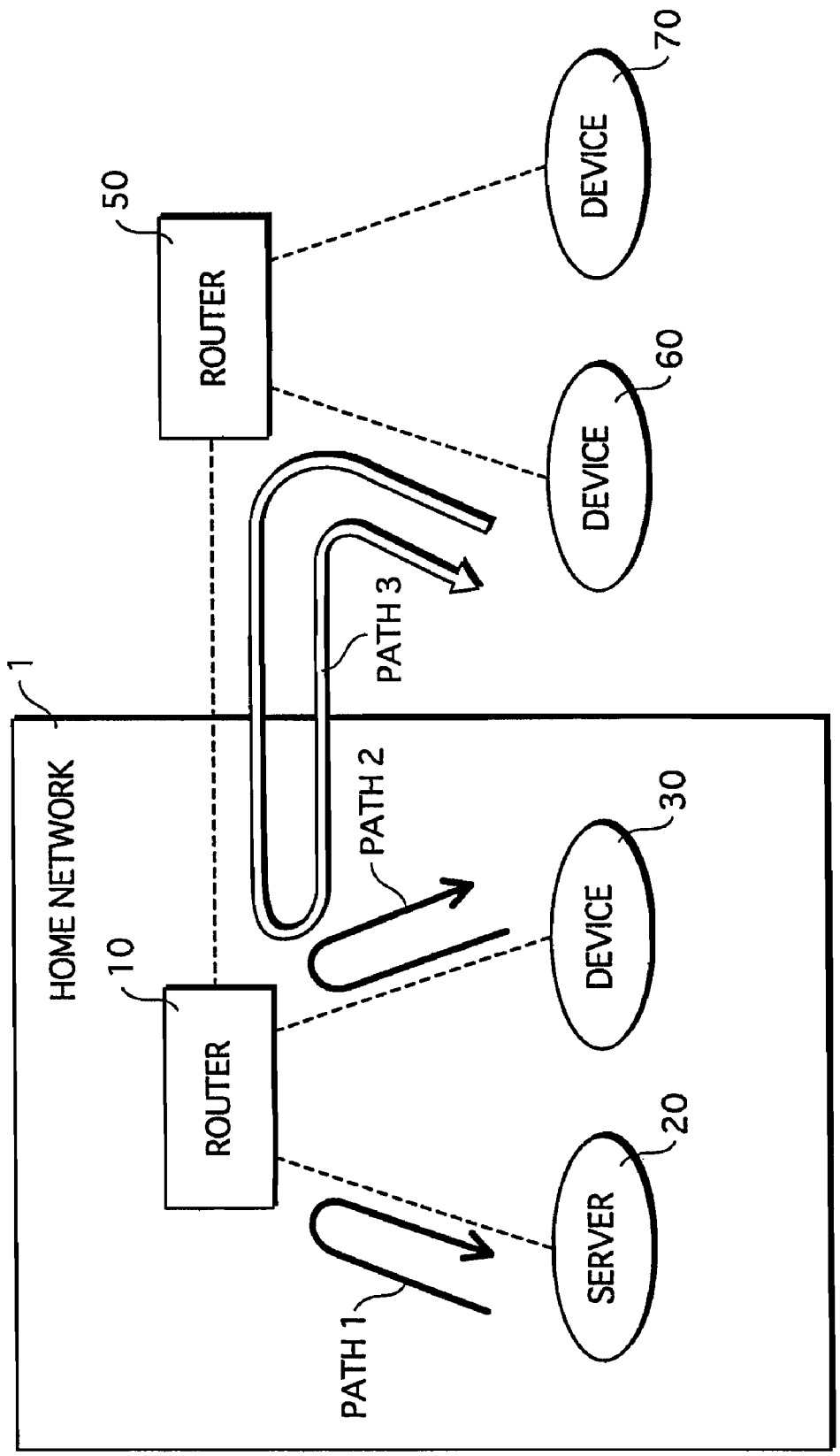
FIG. 15 shows the network construction relating to a fourth embodiment of the present invention.

FIG. 15 shows the network construction relating to the fourth embodiment of the present invention.

The network construction relating to the present embodiment is the same as the network construction described in the third embodiment.

Here, the following describes the method employed by the server 20 for judging whether the target device is within its home network.

(1) The server 20 and the target device have their clocks synchronized in advance. The server 20 and the target device share common information about the transmission-start time at which transmission of measurement data is to be started.

(2) When the present time reaches the transmission-start time of the measurement data, the server 20 transmits first echo-request data to the router 10, and receives first echo-reply data transmitted in response to the first echo-request data from the router 10. The server 20 measures the reference time required between transmitting the first echo-request data and receiving the first echo-reply data.

(3) On the other hand, when the present time reaches the transmission-start time of the measurement data, the target device transmits second echo-request data to the router 10, and receives second echo-reply data transmitted in response to the second echo-request data from the router 10. The target device measures the target time required between transmitting the second echo-request data and receiving the second echo-reply data. The target device notifies the server 20 of the target time.

(4) When a difference between the reference time and the target time is in a predetermined range (e.g., in a range of 10% of the reference time), the server 20 judges that the target device is within its home network.

The total transmission time required to transmit measurement data on each path can be expressed as $$T1=2tsr+2tr+tpr,$$

$$T2=2tra+2tr+tpr, \text{ and}$$

$$T3=2trb+4tr+2trr+tpr,$$

where "T1" is the total transmission time on path 1 (server 20-router 10-server 20), "T2" is the total transmission time on path 2 (device 30-router 10-device 30), and "T3" is the total transmission time on path 3 (device 60-router 50-router 10-router 50-device 60), and "tsr" is the transmission time between the server 20 and the router 10, "tra" is the transmission time between the router 10 and the device 30, "tr" is the time required for routing processing by the router 10 and the router 50, "tpr" is the time required for ping processing by the router 10, "trr" is the transmission time between the router 10 and the router 50, and "trb" is the transmission time between the router 50 and the device 60.

Assuming that tsr=tra=trb=trr, $$T1=2tsr+2tr+tpr,$$

$$T2=2tsr+2tr+tpr, \text{ and}$$

$$T3=4tsr+4tr+tpr.$$

The total transmission time is the same on path 1 and path 2, but is different on path 3.

Here, the network is assumed to comply with 100Base (with a transmission speed of 100 Mbps), and the size of the measurement data is assumed to be about 100 bytes, considering a relatively small size of its user data.

Based on the above assumption, the transmission time (tsr, tra, trb, trr) between neighboring devices among the server 20, the router 10, the device 30, and the device 60, is uniformly 8 µs.

The time required for routing processing by the router 10 or the router 50 is about 100 µs when the routing processing is executed by software.

Further, the time required for ping processing by the router 10 is about 200 µs.

In this case, the total transmission time is

416 µs on path 1,

416 µs on path 2, and

632 µs on path 3.

When the target device is the device 30, the server 20 obtains the target time of 416 µs against the reference time of 416 µs. When the target device is the device 60, the server 20 obtains the target time of 632 µs against the reference time of 416 µs.

The server 20 compares the reference time and the target time, and when a difference between the reference time and the target time is in a predetermined range (e.g., in a range of 10% of the reference time), judges that the target device is within the home network. The predetermined range here is to be such a range that enables judgment as to whether the communication path includes one router, or a plurality of routers.

It should be noted here that the router 10 and the router 50 are usually connected via an ISP. In the case where the router 10 and the router 50 are connected via an ISP, a difference in the total transmission time between path 2 and path 3 is considered larger than in the case of the present embodiment.

The following describes in detail the constructions and the operations of the server and the like realizing the above functions.

Figure 16:
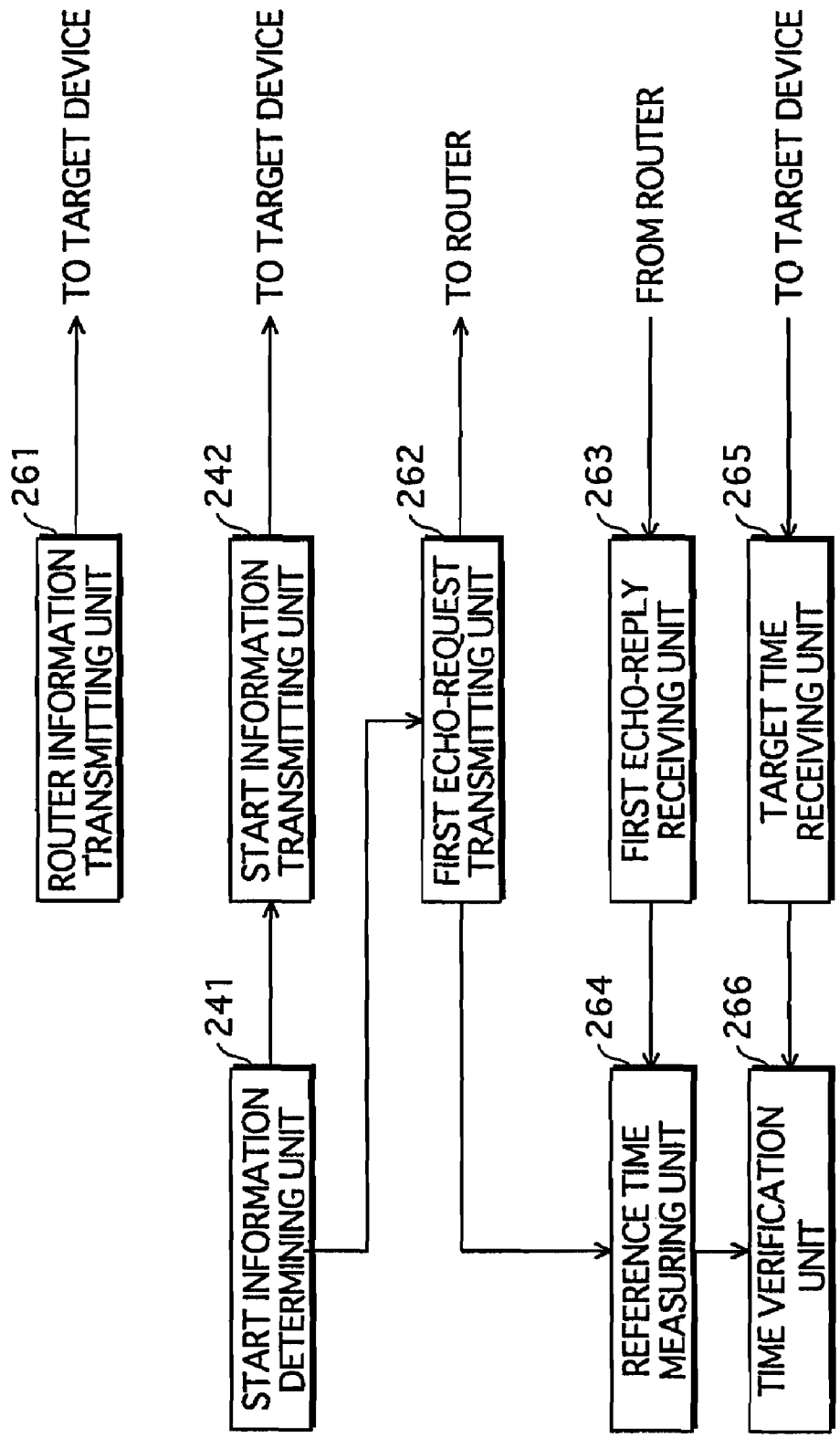
FIG. 16 shows the construction of the server relating to the fourth embodiment.

FIG. 16 shows the construction of the server relating to the fourth embodiment.

The server includes a start information determining unit 241, a start information transmitting unit 242, a router information transmitting unit 261, a first echo-request transmitting unit 262, a first echo-reply receiving unit 263, a reference time measuring unit 264, a target time receiving unit 265, and a time verification unit 266.

The start information determining unit 241 and the start information transmitting unit 242 are the same as the corresponding components in the third embodiment, and therefore, are not described in the present embodiment.

The router information transmitting unit 261 transmits router information to the target device. Here, the router information is specifically an IP address of a nearby router. Using the router information, the target device can identify to which router echo-request data is to be transmitted.

The first echo-request transmitting unit 262 transmits first echo-request data to the nearby router, when the present time reaches the start time.

The first echo-reply receiving unit 263 receives first echo-reply data from the router.

The reference time measuring unit 264 measures, as the reference time, the time required between (a) the transmission of the first echo-request data by the first echo-request transmitting unit 262 and (b) the reception of the first echo-reply data by the first echo-reply receiving unit 263.

The target time receiving unit 265 receives target time information indicating the target time measured by the target device.

The time verification unit 266 compares the target time obtained by the target time receiving unit 265 with the reference time measured by the reference time measuring unit 264, and when a difference between the target time and the reference time is in a predetermined range (e.g., in a range of 10% of the reference time), judges that the target device is within its home network.

Figure 17:
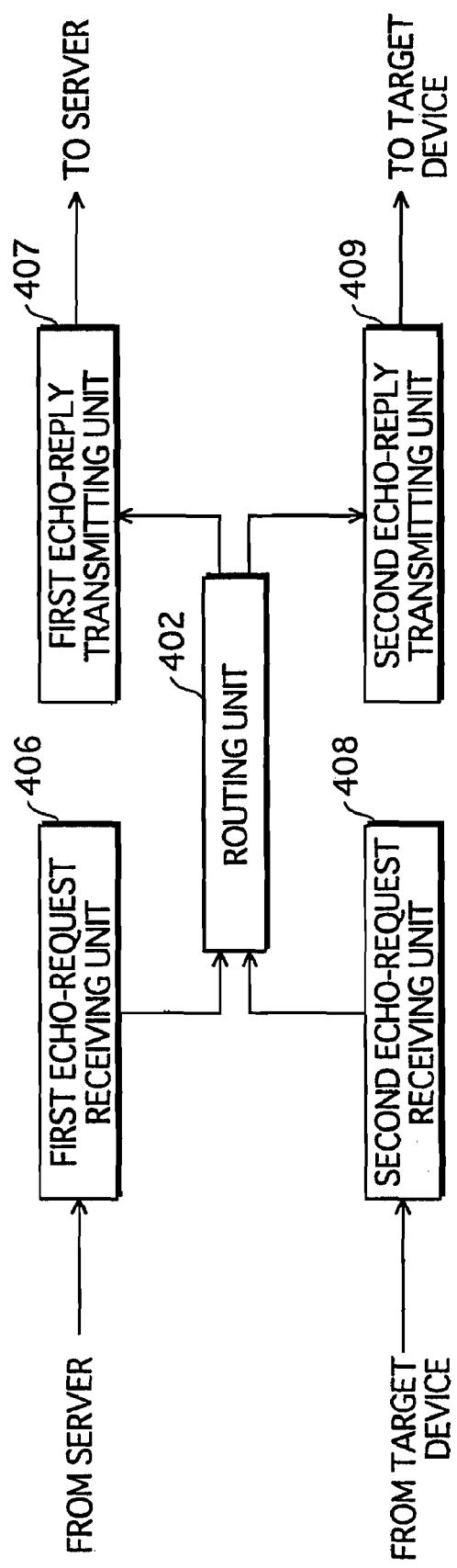
FIG. 17 shows the construction of a router relating to the fourth embodiment.

FIG. 17 shows the construction of the router relating to the fourth embodiment.

The router includes a first echo-request receiving unit 406, a routing unit 402, a first echo-reply transmitting unit 407, a second echo-request receiving unit 408, and a second echo-reply transmitting unit 409.

The routing unit 402 is the same as the corresponding component in the third embodiment, and therefore is not described in the present embodiment.

The first echo-request receiving unit 406 receives first echo-request data transmitted from the server.

The first echo-reply transmitting unit 407 transmits first echo-reply data corresponding to the first echo-request data to the server that is identified by the routing unit 402 as the transfer destination.

The second echo-request receiving unit 408 receives second echo-request data transmitted from the target device.

The second echo-reply transmitting unit 409 transmits second echo-reply data corresponding to the second echo-request data to the target device identifier by the routing unit 402 as the transfer destination.

Figure 18:
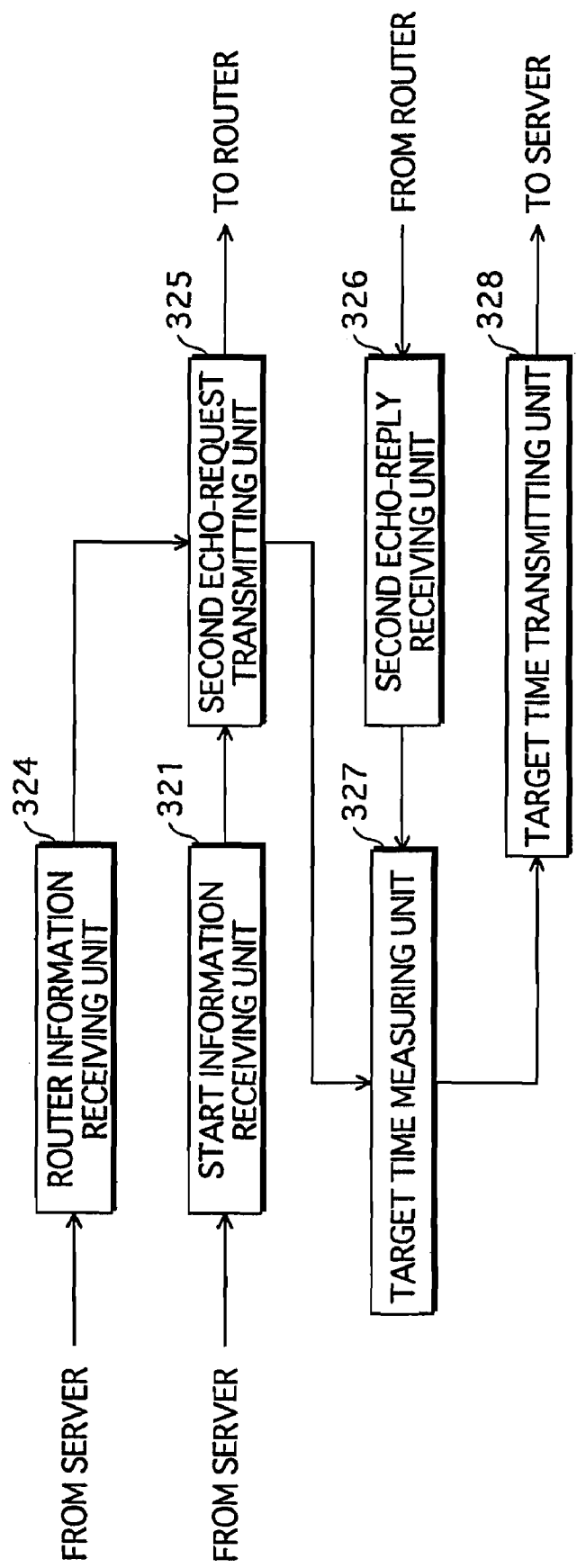
FIG. 18 shows the construction of a target device relating to the fourth embodiment.

FIG. 18 shows the construction of the target device relating to the fourth embodiment.

The target device includes a start information receiving unit 321, a router information receiving unit 324, a second echo-request transmitting unit 325, a second echo-reply receiving unit 326, a target time measuring unit 327, and a target time transmitting unit 328.

The start information receiving unit 321 is the same as the corresponding component in the third embodiment, and therefore is not described in the present embodiment.

The router information receiving unit 324 receives router information from the server.

The second echo-request transmitting unit 325 transmits second echo-request data to the router identified using the router information, when the present time reaches the start time.

The second echo-reply receiving unit 326 receives second echo-reply data from the router.

The target time measuring unit 327 measures the target time required between (a) the transmission of the second echo-request data by the second echo-request transmitting unit 325 and (b) the reception of the second echo-reply data by the second echo-reply receiving unit 326.

The target time transmitting unit 328 transmits, to the server, target time information indicating the target time measured by the target time measuring unit 327.

<Operations>

The following describes the operations of the server with the above-described construction for executing the AD judgment process.

Figure 19:
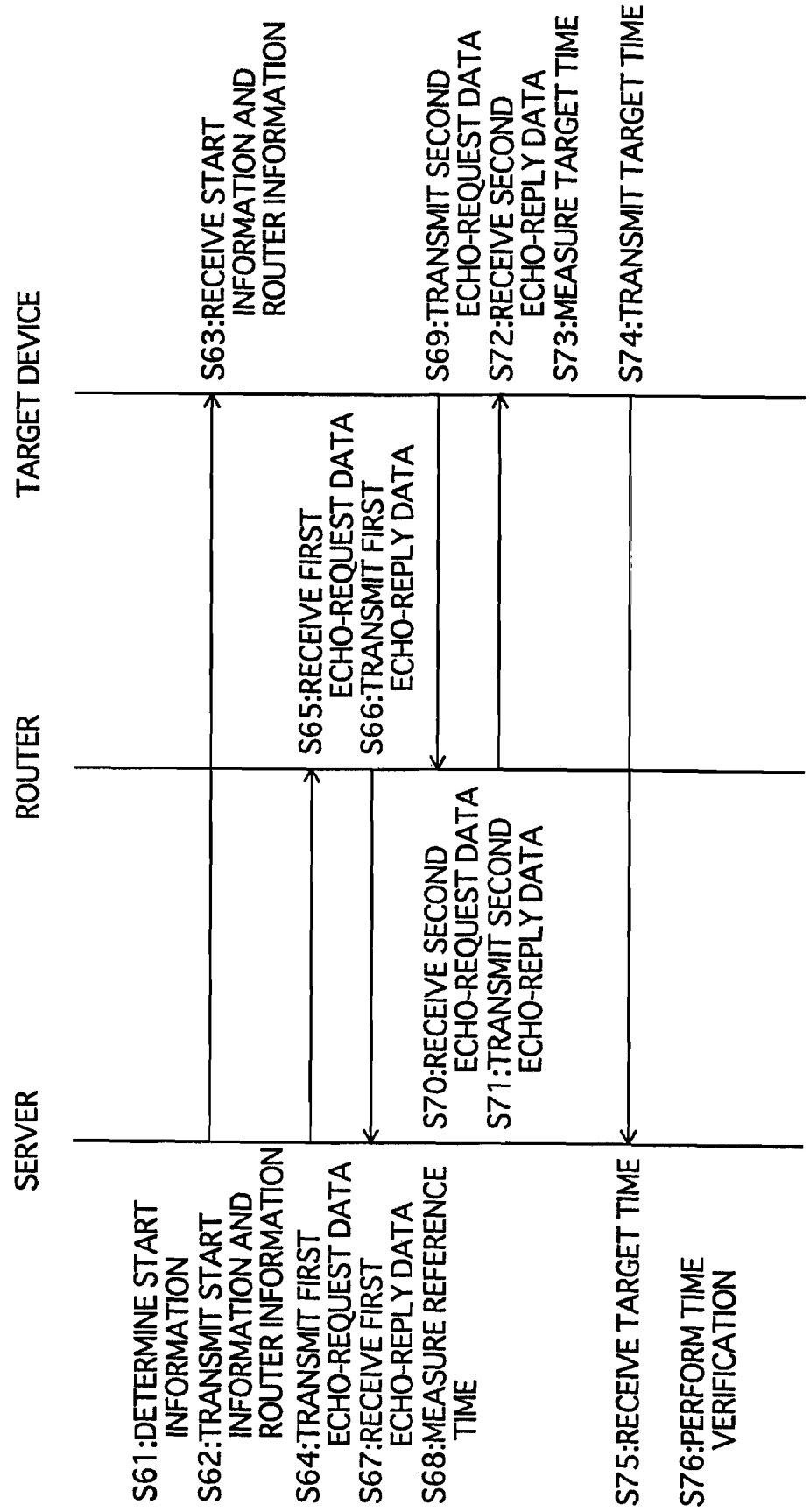
FIG. 19 shows the operations of the server, the router, and the target device relating to the fourth embodiment.

FIG. 19 shows the operations of the server, the router, and the target device relating to the fourth embodiment.

Step S61: The server determines the start time of the AD judgment process.

Step S62: The server transmits, to the target device, start information indicating the start time, and router information indicating an IP address of the router.

Step S63: The target device receives the start information and the router information.

Step S64: The server transmits first echo-request data to the router when the present time reaches the start time determined in step S61.

Step S65: The router receives first echo-request data.

Step S66: The router executes routing processing, i.e., identifies the server that is the transmission destination, and transmits first echo-reply data corresponding to the first echo-request data, to the server identified as the transmission destination.

Step S67: The server receives the first echo-reply data from the router.

Step S68: The server measures, as the reference time, the time required between (a) the transmission of the first echo-request data in step S64 and (b) the reception of the first echo-reply data in step S67.

Step S69: The target device transmits the second echo-request data to the router identified using the router information, when the present time reaches the start time obtained in step S63.

Step S70: The router receives the second echo-request data.

Step S71: The router executes routing processing, i.e., identifies the target device that is the transmission destination, and transmits second echo-reply data corresponding to the second echo-request data, to the target device identified as the transmission destination.

Step S72: The target device receives the second echo-reply data from the router.

Step S73: The target device measures, as the target time, the time required between (a) the transmission of the second echo-request data in step S69 and (b) the reception of the second echo-reply data in step S71.

Step S74: The target device transmits target time information indicating the target time measured in step S73 to the server.

Step S75: The server receives the target time information.

Step S76: The server compares the target time obtained in step S75 and the reference time measured in step S68, and when a difference between the target time and the reference time is in a predetermined range (e.g., in a range of 10% of the reference time), judges that the target device is within the home network.

As described above, the server can obtain the reference time determined depending on the communication traffic at the time of the AD judgment process, as in the third embodiment. Also, the server can judge whether the target device is within the home network using the existing program Ping. With the existing program Ping being used, a new program does not have to be developed for transmitting and receiving measurement data, thereby reducing burdens on developers of the server.

Fifth Embodiment

In the fifth embodiment, the home network is assumed to include a device that has been already judged to belong to the AD (referred to as an "AD device"). The server executes the AD judgment process on a target device that is other than the AD device.

In the fifth embodiment, the reference time is assumed to be a time period between (a) when the server transmits first echo-request data to the AD device and (b) when the server receives first echo-reply data transmitted as a response from the AD device. The target time is assumed to be a time period between (a) when the server transmits second echo-request data to the target device and (b) when the server receives second echo-reply data transmitted as a response from the target device. The AD device is assumed to be a device that has been judged to belong to the AD, using such a judgment method as described in the third and fourth embodiments.

In the third embodiment, the server and the target device are required to simultaneously transmit measurement data. For this purpose, time synchronization is required between the server and the target device. The time synchronization, however, cannot avoid a certain error.

In the fifth embodiment, the server is the transmission source of both the first echo-request data and the second echo-request data. Therefore, the time synchronization between the server and the target device required in the third embodiment is unnecessary in the present embodiment. In the fifth embodiment, therefore, the measurement of the target time and the reference time is no longer affected by an error unavoidable in the time synchronization.

As in the third embodiment, the authenticity verification is not described in the present embodiment.

<Construction>

Figure 20:
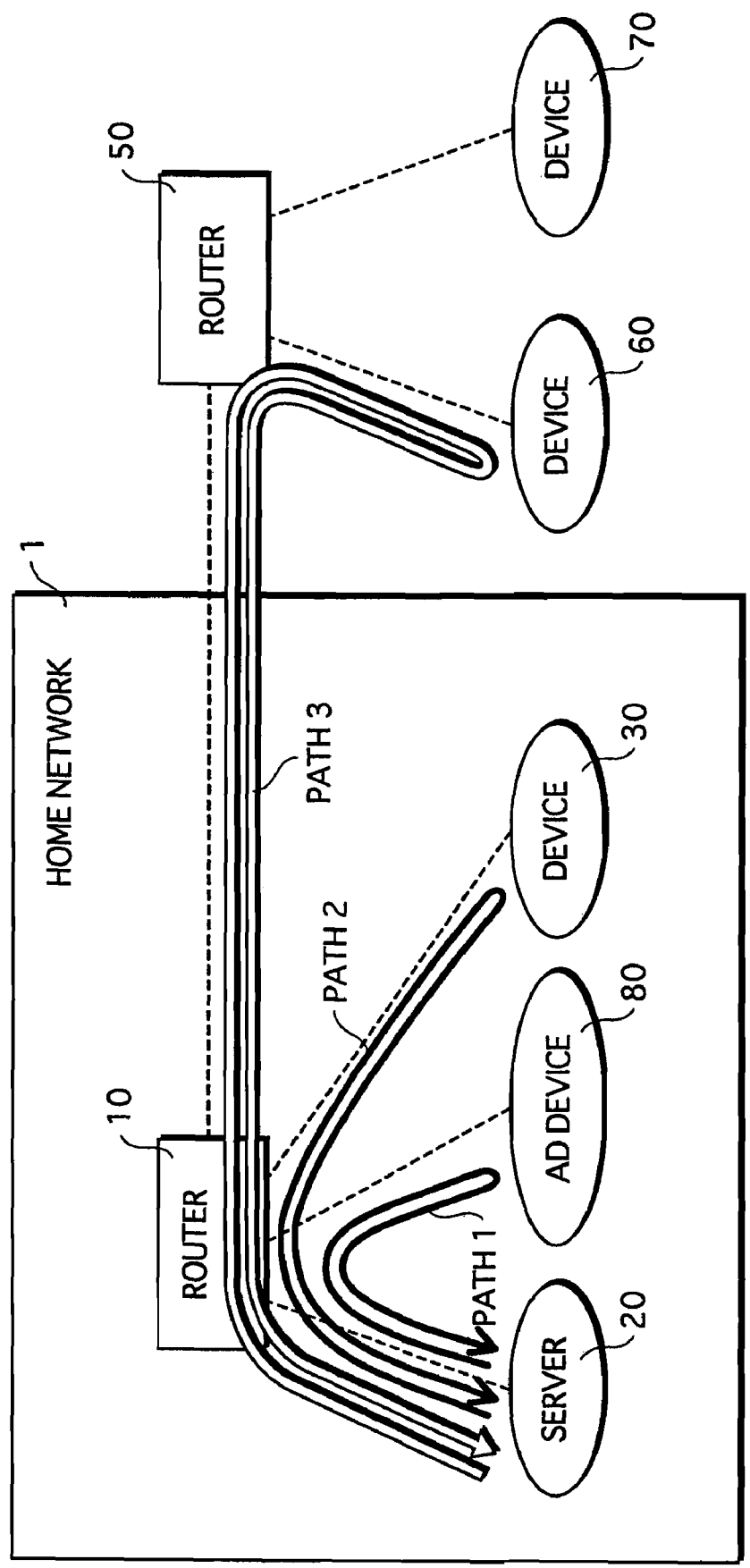
FIG. 20 shows the network construction relating to a fifth embodiment of the present invention.

FIG. 20 shows the network construction relating to the fifth embodiment of the present invention.

The home network 1 includes therein an AD device 80 that has been judged to belong to the AD. Except this, the network construction relating to the present embodiment is the same as the network construction relating to the third embodiment and the like.

The following describes the method employed by the server 20 for judging whether the target device is within its home network.

(1) The server 20 transmits first echo-request data to the AD device 80, and receives first echo-reply data transmitted in response to the first echo-request data from the AD device 80. The server 20 measures, as the reference time, the time required between transmitting the first echo-request data and receiving the first echo-reply data.

(2) The server 20 transmits second echo-request data to the target device, and receives second echo-reply data transmitted in response to the second echo-request data from the target device. The server 20 measures, as the target time, the time required between transmitting the second echo-request data and receiving the second echo-reply data.

(3) When a difference between the reference time and the target time is in a predetermined range (e.g., in a range of 10% of the reference time), the server 20 judges that the target device is within its home network.

The total transmission time required to transmit measurement data on each path can be expressed as $$T1=2tsr+2tr+2trp+tpp,$$

$$T2=2tsr+2tr+2tra+tpa, \text{ and}$$

$$T3=2tsr+4tr+2trr+2trb+tpb,$$

where "T1" is the total transmission time on path 1 (server 20-router 10-AD device 80-router 10-server 20), "T2" is the total transmission time on path 2 (server 20-router 10-device 30-router 10-server 20), and "T3" is the total transmission time on path 3 (server 20-router 10-router 50-device 60-router 50-router 10-server 20), and "tsr" is the transmission time between the server 20 and the router 10, "trp" is the transmission time between the router 10 and the AD device 80, "tra" is the transmission time between the router 10 and the device 30, "tr" is the time required for routing processing by the router 10 and the router 50, "tpp" is the time required for ping processing by the AD device 80, "tpa" is the time required for ping processing by the device 30, "trr" is the transmission time between the router 10 and the router 50, "trb" is the transmission time between the router 50 and the device 60, and "tpb" is the time required for ping processing by the device 60.

Assuming that tsr=trp=tra=trb=trr and tpp=tpa=tpb, $$T1=4tsr+2tr+tpp,$$

$$T2=4tsr+2tr+tpa, \text{ and}$$

$$T3=6tsr+4tr+tpb.$$

The total transmission time is the same on path 1 and path 2, but is different on path 3. The quantitative assessment is not given in the present embodiment, but is considered valid, as in the third and fourth embodiments.

The following describes in detail the constructions and the operations of the server and the like realizing the above functions.

Figure 21:
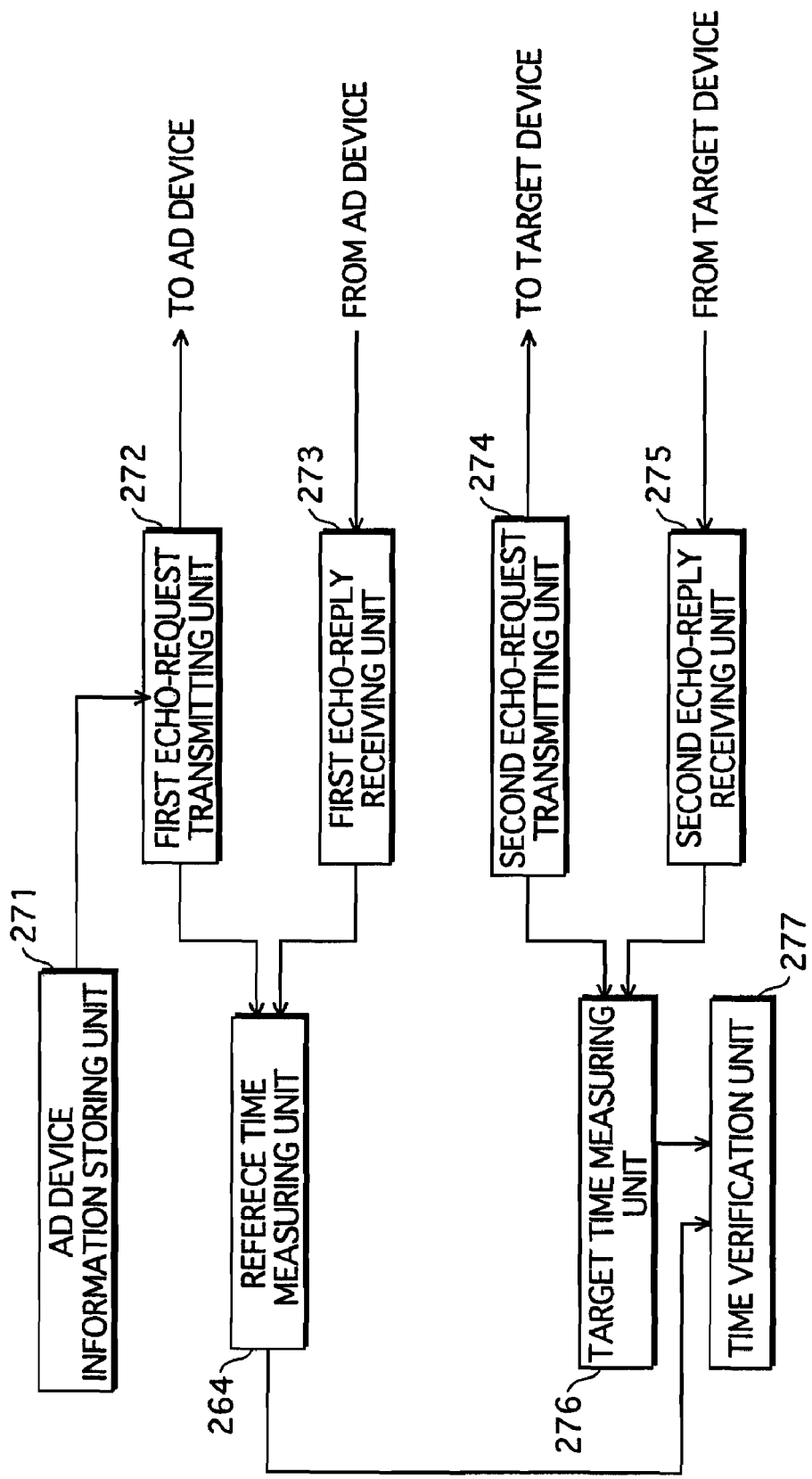
FIG. 21 shows the construction of a server relating to the fifth embodiment.

FIG. 21 shows the construction of the server relating to the fifth embodiment.

The server includes an AD device information storing unit 271, a first echo-request transmitting unit 272, a first echo-reply receiving unit 273, a reference time measuring unit 264, a second echo-request transmitting unit 274, a second echo-reply receiving unit 275, a target time measuring unit 276, and a time verification unit 277.

The reference time measuring unit 264 is the same as the corresponding component in the fourth embodiment, and therefore is not described in the present embodiment.

The AD device information storing unit 271 stores an IP address of an AD device that has been judged as an authentic device within the home network. The AD device information storing unit 271 transmits the IP address of the AD device to the first echo-request transmitting unit 272 when the AD judgment process is started. If the home network includes a plurality of AD devices, the AD device information storing unit 271 selects one of the AD devices, and transmits an IP address of the selected AD device to the first echo-request transmitting unit 272.

The first echo-request transmitting unit 272 transmits first echo-request data to the AD device.

The first echo-reply receiving unit 273 receives first echo-reply data from the AD device.

The second echo-request transmitting unit 274 transmits second echo-request data to the target device.

The second echo-reply receiving unit 275 receives second echo-reply data from the target device.

The target time measuring unit 276 measures, as the target time, the time required between (a) the transmission of the second echo-request data by the second echo-request transmitting unit 274 and (b) the reception of the second echo-reply data by the second echo-reply receiving unit 275.

The time verification unit 277 compares the target time obtained by the target time measuring unit 276 with the reference time measured by the reference time measuring unit 264, and when a difference between the target time and the reference time is in a predetermined range (e.g., in a range of 10% of the reference time), judges that the target device is within the home network.

The router relating to the fifth embodiment has the same construction as the router relating to the fourth embodiment, and therefore is not described in the present embodiment. Also, the target device relating to the fifth embodiment has the same construction as the target device relating to the first embodiment, and therefore is not described in the present embodiment.

<Operations>

The following describes the operations of the server with the above-described construction for executing the AD judgment process.

Figure 22:
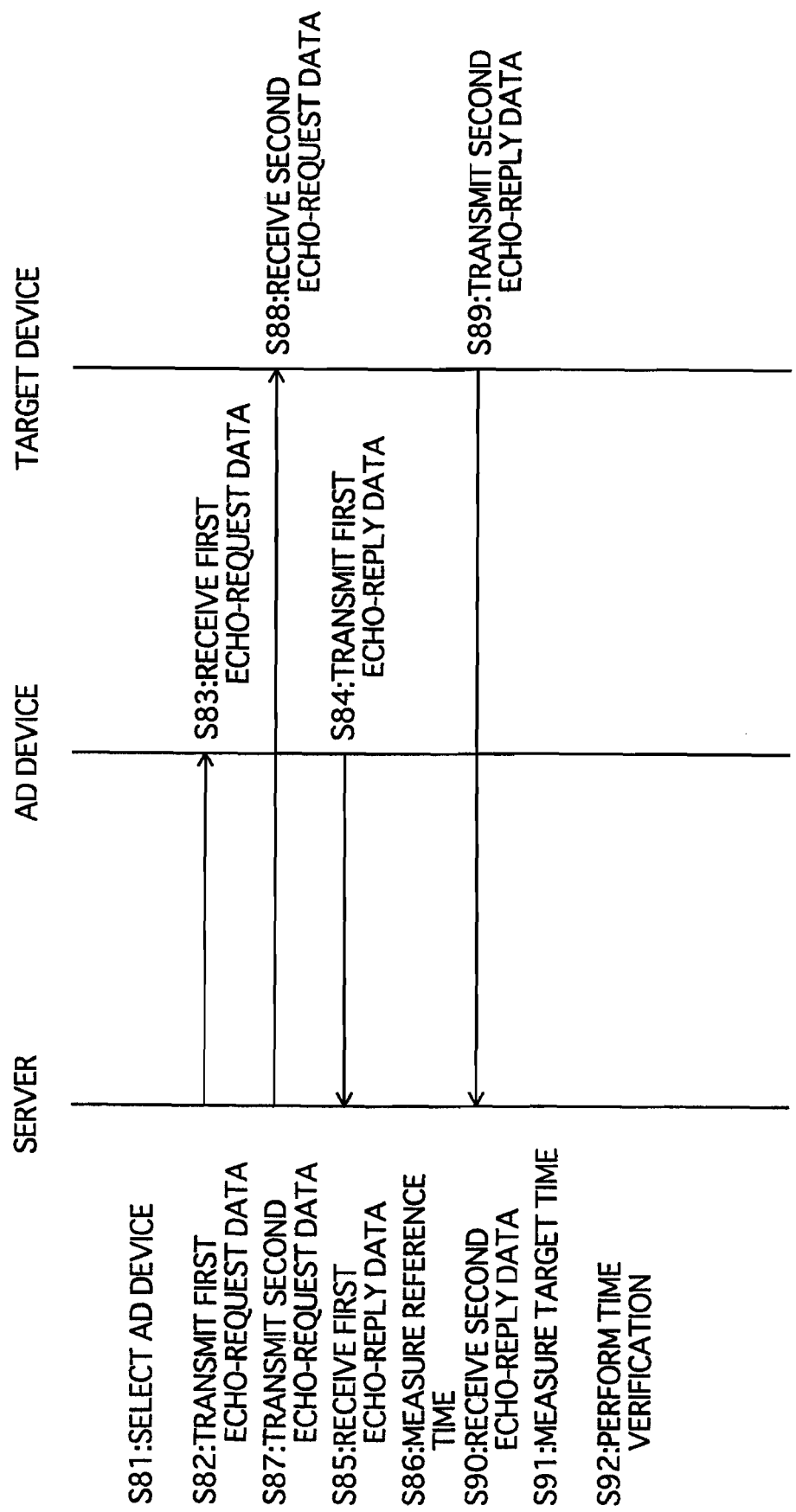
FIG. 22 shows the operations of the server, an AD device, and a target device relating to the fifth embodiment.

FIG. 22 shows the operations of the server, the AD device, and the target device relating to the fifth embodiment.

Step S81: The server selects an AD device.

Step S82: The server transmits first echo-request data to the AD device selected in step S81.

Step S83: The AD device receives first echo-request data.

Step S84: The AD device transmits first echo-reply data corresponding to the first echo-request data to the server.

Step S85: The server receives the first echo-reply data.

Step S86: The server measures, as the reference time, the time required between (a) the transmission of the first echo-request data in step S82 and (b) the reception of the first echo-reply data in step S85.

Step S87: The server transmits second echo-request data to the target device.

Step S88: The target device receives the second echo-request data.

Step S89: The target device transmits second echo-reply data corresponding to the second echo-request data to the server.

Step S90: The server receives the second echo-reply data.

Step S91: The server measures, as the target time, the time required between (a) the transmission of the second echo-request data in step S87 and (b) the reception of the second echo-reply data in step S90.

Step S92: The server compares the target time measured in step S91 with the reference time measured in step S86, and when a difference between the target time and the reference time is in a predetermined range (e.g., in a range of 10% of the reference time), judges that the target device is within the home network.

As described above, the server can obtain the reference time determined depending on the communication traffic at the time of the AD judgment process, as in the third embodiment. Further, the server is the transmission source of both the first echo-request data and the second echo-request data, and therefore does not require time synchronization with the target device as required by the server relating to the third embodiment. Accordingly, the server can measure the target time and the reference time without being affected by an error unavoidable in the time synchronization.

Sixth Embodiment

<Outline>

In the sixth embodiment of the present invention, the time required by the measurement data (echo-request data and echo-reply data) to travel on a cable etc. is excluded from the total transmission time, because such time is negligibly short as compared with the time required for routing processing and ping processing.

In the sixth embodiment, the reference time is assumed to be a time period between (a) when the server transmits first echo-request data to a nearby router and (b) when the server receives first echo-reply data transmitted as a response from the nearby router.

The target time is assumed to be a time period between (a) when the server transmits second echo-request data to the target device and (b) when the server receives second echo-reply data transmitted as a response from the target device.

In the fifth embodiment, the server measures the reference time by utilizing an AD device, and therefore does not require time synchronization with the target device. However, there may be cases where no device is yet to be judged to belong to the AD in the home network, like a case where the home network is to be newly established. In such a case, the server cannot execute the AD judgment process.

In the sixth embodiment, the server is enabled to execute the AD judgment process on the target device even if its home network includes no AD device, and further, time synchronization is not required between the server and the target device.

As in the third embodiment, the authenticity verification is not described in the present embodiment.

<Construction>

Figure 23:
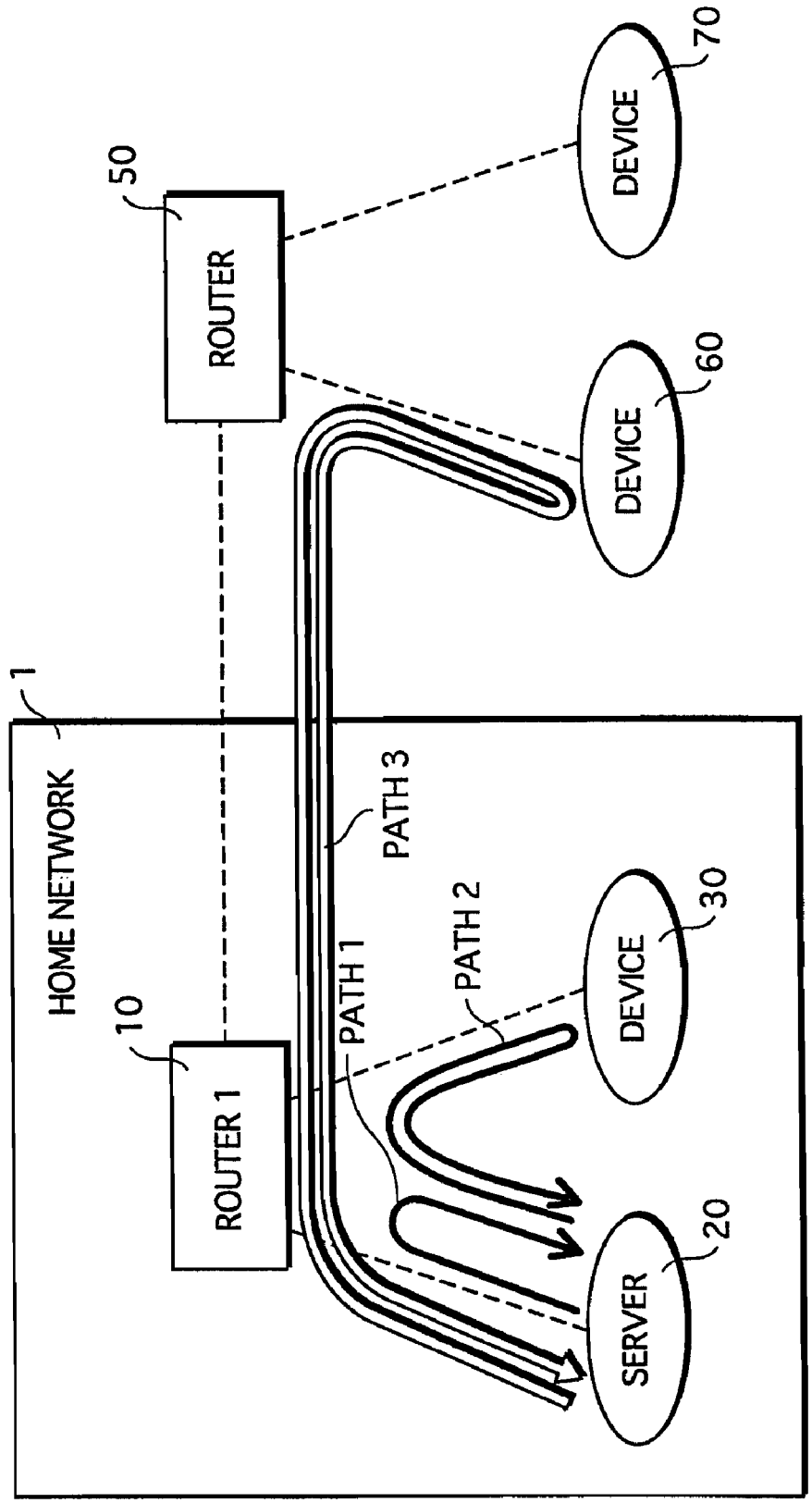
FIG. 23 shows the network construction relating to a sixth embodiment of the present invention.

FIG. 23 shows the network construction relating to the sixth embodiment of the present invention.

The network construction relating to the sixth embodiment is the same as the network construction relating to the third embodiment.

The following describes the method employed by the server 20 for judging whether the target device is within its home network.

(1) The server 20 transmits first echo-request data to the router 10, and receives first echo-reply data transmitted in response to the first echo-request data from the router 10. The server 20 measures, as the reference time, the time required between transmitting the first echo-request data and receiving the first echo-reply data.

(2) The server 20 transmits second echo-request data to the target device, and receives second echo-reply data transmitted in response to the second echo-request data from the target device. The server 20 measures, as the target time, the time required between transmitting the second echo-request data and receiving the second echo-reply data.

(3) When a difference between the reference time and the target time is in a predetermined range (e.g., in a range of 10% of the reference time), the server 20 judges that the target device is within its home network.

The total transmission time required to transmit measurement data on each path can be expressed as $$T1 = 2tsr + 2tr + tpr,$$

$$T2 = 2tsr + 2tr + 2tra + tpa, \text{ and}$$

$$T3 = 2tsr + 4tr + 2trr + 2trb + tpb,$$

where "T1" is the total transmission time on path 1 (server 20-router 10-server 20), "T2" is the total transmission time on path 2 (server 20-router 10-device 30-router 10-server 20), and "T3" is the total transmission time on path 3 (server 20-router 10-router 50-device 60-router 50-router 10-server 20), and "tsr" is the transmission time between the server 20 and the router 10, "tra" is the transmission time between the router 10 and the device 30, "tr" is the time required for routing processing by the router 10 and the router 50, "tpr" is the time required for ping processing by the router 10, "tpa" is the time required for ping processing by the device 30, "trr" is the transmission time between the router 10 and the router 50, "trb" is the transmission time between the router 50 and the device 60, and "tpb" is the time required for ping processing by the device 60.

Assuming that tpp=tpa=tpb, and that the time tsr, tra, trb, and trr required by the measurement data to be transmitted between the server and the router, etc. are negligibly short, as compared with the time required for routing processing tr, the time required for ping processing tpr, etc., $$T1 = 2tr + tpr,$$

$$T2 = 2tr + tpa, \text{ and}$$

$$T3 = 4tr + tpb.$$

The total transmission time is the same on path 1 and path 2, but is different on path 3. The quantitative assessment is not given in the present embodiment, but is considered valid, as in the third and fourth embodiments.

The following describes in detail the constructions and the operations of the server and the like realizing the above functions.

Figure 24:
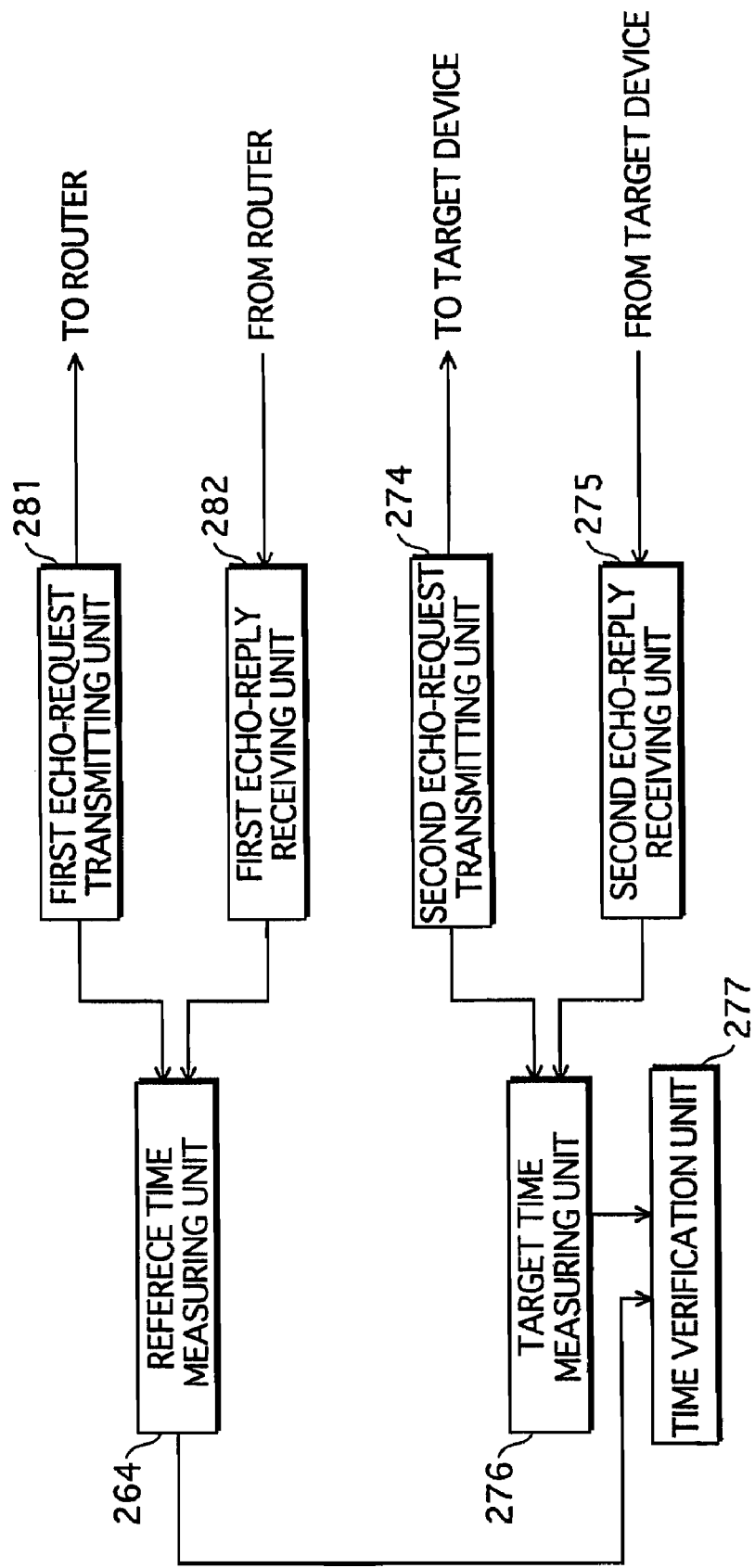
FIG. 24 shows the construction of a server relating to the sixth embodiment.

FIG. 24 shows the construction of the server relating to the sixth embodiment.

The server includes a first echo-request transmitting unit 281, a first echo-reply receiving unit 282, a reference time measuring unit 264, a second echo-request transmitting unit 274, a second echo-reply receiving unit 275, a target time measuring unit 276, and a time verification unit 277.

The server relating to the sixth embodiment has the same construction as the server relating to the fifth embodiment except that the AD device information storing unit 271 is not provided therein. This is because the server relating to the sixth embodiment always uses a nearby router as a reference device.

Also, the sixth embodiment is the same as the fifth embodiment except that the router is the transmission destination of the first echo-request data transmitted from the first echo-request transmitting unit 281 as well as the transmission source of the first echo-reply data received by the first echo-reply receiving unit 282.

As in the fifth embodiment, the constructions of the router and the target device relating to the sixth embodiment are not described in the present embodiment.

<Operations>

The following describes the operations of the server with the above-described construction for executing the AD judgment process.

FIG. 25 shows the operations of the server, the router, and the target device relating to the sixth embodiment.

Step S101: The server transmits first echo-request data to the router.

Step S102: The router receives the first echo-request data.

Step S103: The router transmits first echo-reply data corresponding to the first echo-request data to the server.

Step S104: The server receives the first echo-reply data.

Step S105: The server measures, as the reference time, the time required between (a) the transmission of the first echo-request data in step S101 and (b) the reception of the first echo-reply data in step S104.

Step S106: The server transmits second echo-request data to the target device.

Step S107: The target device receives the second echo-request data.

Step S108: The target device transmits second echo-reply data corresponding to the second echo-request data to the server.

Step S109: The server receives the second echo-reply data.

Step S110: The server measures, as the target time, the time required between (a) the transmission of the second echo-request data in step S106 and (b) the reception of the second echo-reply data in step S109.

Step S111: The server compares the target time measured in step S110 with the reference time measured in step S105, and when a difference between the target time and the reference time is in a predetermined range (e.g., in a range of 10% of the reference time), judges that the target device is within the home network.

As described above, the server can obtain the reference time determined depending on the communication traffic at the time of the AD judgment process as in the third embodiment. As in the fifth embodiment, the server is the transmission source of both the first echo-request data and the second echo-request data, and therefore does not require time synchronization with the target device as required by the server relating to the third embodiment. Accordingly, the server can measure the target time and the reference time without being affected by an error unavoidable in the time synchronization. Further, because the server always uses a nearby router as a reference device, the server can execute the AD judgment process on the target device regardless of whether the home network includes an AD device.

<Other Modifications>

The above embodiments all describe the case where the server executes the AD judgment process using results of the time verification and the authenticity verification. This is because the above embodiments relate to such a system where the device belonging to the AD is defined as an "authentic device within the home network". The contents of the AD judgment process can be modified depending on the definition of the device belonging to the AD. For example, in such a system where the device belonging to the AD is defined as a "device within the home network", the authenticity verification is not performed. In such a system, the server performs only the time verification for the AD judgment process.

When the server judges that the target device does not belong to the AD in the AD judgment process executed once, the server may retry the AD judgment process. In the AD judgment process for the second time, the server is required to use different data from the previously used data as authentication data T1 and T2. For example, the server may use, as the authentication data T1, data obtained by adding 1 to the previously used random number An, and encrypting the resulting random number using the private information Ks. Further, the method for generating the authentication data T1 should not be limited to the method specifically described in the first embodiment. Other methods may also be employed as long as these methods allow the authentication data to be shared only between the server and the target device, and allow the authentication data to be readily changed.

Also, the server may perform the authenticity verification in every AD judgment process, regardless of the result of its time verification.

When the AD judgment process is repeatedly executed, the maximum number of times the AD judgment process is executed may be set. With the AD judgment process of the maximum number of times, if the target time is still judged not to be equal to or shorter than the reference time, or a difference between the target time and the reference time is still judged not to be in a predetermined range, the target device may be finally judged as external to the home network.

When the server judges that the target device does not belong to the AD, the subsequent processing basically depends on the application. Examples of the subsequent processing are as follows.

Example 1

The AD judgment process on the target device is thereafter permitted any number of times.

Example 2

The AD judgment process on the target device is thereafter permitted only a predetermined number of times, and if the target device is judged not to belong to the AD in the AD judgment process executed the predetermined number of times, the subsequent processing is shown in Examples 3 and 4.

Example 3

The AD judgment process on the target device is permitted only after a predetermined period of time elapses.

Example 4

The target device is registered in a list of devices for which the AD judgment process is not permitted, and the AD judgment process on the target device is thereafter not permitted to be executed.

Here, the server may measure the target time and/or the reference time a predetermined number of times for obtaining a more accurate value for the target time and/or the reference time. By doing so, the AD judgment process can be executed without being affected by the communication traffic. In the case where the server measures the target time and/or the reference time a plurality of number of times, the server may use, as the target time and/or the reference time, the smallest value or an average value of a plurality of measured values.

Using the smallest value as the target time and/or the reference time is effective in the following case.

Assume here that the communication path on which echo-reply data is to be transmitted by the target device in response to echo-request data is occupied by other data. In this case, the server waits until the communication path becomes available and then transmits the echo-reply data. Here, the target time is measured as a value obtained by adding the waiting time to the actual transmission time. However, the echo-replay data is so small in data size that it may be inserted between parts of the large-size other data occupying the communication path. The echo-reply data is considered to be transmitted as being inserted in this way at least once in a plurality of times of the AD judgment process, thereby enabling the server to obtain, as the target time, the actual transmission time to which no waiting time is added.

For the method of using an average value of a plurality of measured values, some of the measured values may be extremely larger than other values despite being obtained for the same communication path. If such extremely large values are also used to calculate the average value, a margin of error may be expanded. To avoid this, a range of values used to calculate the average value is to be determined in advance, and only values within the determined range are to be used for calculation of the average value. Alternatively, when extremely large values are among the measured values, the AD judgment process may be aborted, based on the assumption that all the measured values are not appropriate. As one example, such great variation in measured values may be attributed to the cache function of the router for addresses to which routing processing has already been performed. The following describes such cache function.

For example, when the router receives measurement data from the server and transfers the measurement data to the target device, the router passes the measurement data from an IP layer to a data link layer, and stores the measurement data in a frame of the data link layer. To transfer the frame to the target device, the router needs to be given an MAC (Media Access Control) address of the target device.

The measurement data stores, in its packet header, an IP address of a transmission source and an IP address of a transmission destination (see FIG. 11), but does not store therein an MAC address of the target device. Therefore, the MAC address is unknown to the router. The router therefore cannot transmit the frame to the target device. Here, the router searches for the MAC address of the target device using ARP (Address Resolution Protocol).

The ARP is a protocol to be used to search for an MAC address using its corresponding IP address. The router broadcasts an ARP packet storing the IP address of the target device. The target device receives the ARP packet. When finding that the IP address stored in the ARP packet is its own IP address, the target device transmits its MAC address to the router. Using this protocol, the router can search and obtain the MAC address of the target device, thereby being enabled to transmit the measurement data to the target device. Further, the router stores the MAC address of the target device for a certain period of time for the sake of subsequent transfer of a frame.

If measurement data is transferred again in this period of time, the router can use the MAC address stored therein, and therefore, can transmit the measurement data more promptly than in the case of transmitting the measurement data for the first time.

In this way, when measurement data is transmitted via a router having the cache function, the target time measured for the first time may greatly differ from the target time measured subsequently. Therefore, it is not preferable to use the target time measured for the first time as a judgment for the AD judgment process. Also, when an average value is calculated from values of the target time measured a plurality of number of times, it is also preferable to exclude the value measured for the first time from the calculation of the average value.

Also, although the above embodiments describe the case where only the server executes the AD judgment process on the target device, both the server and the target device may execute the AD judgment process on each other.

When measurement data, router information, target time information etc. are transmitted and received via the server and the target device, these data may be encrypted, and may be signed. By doing so, spoofing by an unauthorized device can be prevented.

The protocol used for measurement of the target time should not be limited to ICMP. Any protocol can be used, as long as it enables the transmission destination of data to immediately transmit response data upon receipt of the data from the transmission source.

Although the first to sixth embodiments describe the case where the server distributes content, the present invention should not be limited to such. For example, the present invention can be applied to a technique for automatically grouping devices existing in a predetermined range. In this case, too, whether or not to register a device in a group is judged by comparing the target time and the reference time.

Although the third to sixth embodiments describe the case where the reference time is measured for every AD judgment process, the present invention should not be limited to such. The reference time measured once may be stored in a ROM, and may be used thereafter.

The third embodiment describes the case where the time at which the server transmits measurement data with its destination being set as the server and the time at which the target device transmits the measurement data to the server are the same, for the purpose of measuring the reference time and the target time under the same communication traffic condition. However, the time at which the server transmits measurement data and the time at which the target device transmits measurement data may be set different as long as the effect of the communication traffic on the measurement of the target time is negligibly small.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The present invention can be utilized in a home server etc. storing pieces of content that can be used only by authentic devices within a home network. According to the present invention, the home server does not require the user to manually register such home devices, and prevent pieces of content from being distributed to unauthorized devices not permitted to use the pieces of content.

The invention claimed is:

1. A group judgment device that is connected to a network, comprising:
   a content request reception unit operable to receive a content distribution request, which is a request to distribute content, from a target device connected to the network;
   a target time obtaining unit operable to, when the content request reception unit has received the content distribution request, obtain, as a target time, a time required between (a) transmission of first data with a predetermined format to the target device and (b) reception of second data with the predetermined format from the target device, the second data being in response to the first data;
   a judgment unit operable to (i) compare the target time with a reference time, the reference time being a time required between (a) transmission of the first data to a device belonging to a predetermined group and (b) reception of the second data from the device belonging to the group, the second data being in response to the first data, and (ii) judge that the target device belongs to the group when a difference between the target time and the reference time is within a predetermined range, and judge that the target device is external to the group when the difference is not within the predetermined range, the group being made up of one or more devices that are permitted to share the content; and
   a content distribution unit operable to distribute the content to the target device when the judgment unit judges that the target device belongs to the group.

2. The group judgment device of claim 1,
   wherein the target time obtaining unit includes:
   a transmission/reception subunit operable to transmit the first data to the target device and receive, from the target device, the second data transmitted in response to the first data; and
   a measurement subunit operable to measure, as the target time, the time required between (a) the transmission of the first data by the transmission/reception subunit and (b) the reception of the second data by the transmission/reception subunit.

3. The group judgment device of claim 2,
   wherein the transmission/reception subunit transmits to the target device, as the first data, echo-request data based on the Internet Control Message Protocol, and receives from the target device, as the second data, echo-reply data corresponding to the echo-request data.

4. The group judgment device of claim 1,
   wherein the target device measures the target time and transmits target time information indicating the target time, and
   the target time obtaining unit receives the target time information from the target device.

5. The group judgment device of claim 1, further comprising:
   a pre-storing unit operable to store therein a predetermined number of values of the target time,
   wherein the target time obtaining unit employs, as the target time to be used for the comparison by the judgment unit, a smallest value, among the values stored in the pre-storing unit and a value of the obtained target time.

6. The group judgment device of claim 1,
   wherein the judgment unit stores therein a value set in advance as the reference time.

7. The group judgment device of claim 6, further comprising:
   a change receiving unit operable to receive a new value of the reference time from an external source,
   wherein the judgment unit replaces the value stored as the reference time in the judgment unit with the new value received by the change receiving unit.

8. The group judgment device of claim 1,
   wherein the judgment unit includes:
   a reference time storing subunit operable to store therein a value of the reference time set respectively for a connecting medium via which the target device is connected to the network;
   a reception subunit operable to receive, from the target device, medium information indicating the connecting medium via which the target device is connected to the network; and
   a selection subunit operable to select, as the reference time, the value stored in the reference time storing subunit, based on the medium information received by the reception subunit.

9. The group judgment device of claim 8, further comprising:
   a change receiving unit operable to receive a new value of the reference time from an external source,
   wherein the reference time storing subunit replaces a value stored therein as the reference time, with the new value received by the change receiving unit.

10. The group judgment device of claim 1,
    wherein the judgment unit includes:
    a reference time storing subunit operable to store a value of the reference time set for a combination of (a) a first connecting medium via which the group judgment device is connected to the network and (b) a second connecting medium via which the target device is connected to the network;
    a medium detecting subunit operable to detect the first connecting medium;
    a reception subunit operable to receive, from the target device, medium information indicating the second connecting medium; and
    a selection subunit operable to select, as the reference time, the value stored in the reference time storing subunit, based on the combination of (c) the first connecting medium detected by the medium detecting unit and (d) the second connecting medium indicated by the medium information received by the reception subunit.

11. The group judgment device of claim 10, further comprising:
    a change receiving unit operable to receive a new value of the reference time from an external source,
    wherein the reference time storing subunit replaces a value stored therein as the reference time, with the new value received by the change receiving unit.

12. The group judgment device of claim 1,
    wherein the judgment unit includes:
    a transmission/reception subunit operable to transmit the first data to a router nearest to the group judgment device in the network, and receive, from the router, the second data transmitted in response to the first data; and a measurement subunit operable to measure, as the reference time, a time required between (a) the transmission of the first data by the transmission/reception subunit and (b) the reception of the second data by the transmission/reception subunit.

13. The group judgment device of claim 12,
wherein the transmission/reception subunit transmits to the router, as the first data, echo-request data based on the Internet Control Message Protocol, and receives from the router, as the second data, echo-reply data corresponding to the echo-request data.

14. The group judgment device of claim 12, further comprising:
a pre-storing unit operable to store therein a predetermined number of values of the reference time,
wherein the judgment unit employs, as the reference time to be used for the comparison, a smallest value, among the values stored in the pre-storing unit and a value of the measured reference time.

15. The group judgment device of claim 1,
wherein the group judgment device is connected to a reference device via one router, the reference device having been judged to belong to the group, and
the judgment unit includes:
a transmission/reception subunit operable to transmit the first data to the reference device and receive, from the reference device, the second data transmitted in response to the first data; and
a measurement subunit operable to measure, as the reference time, a time required between (a) the transmission of the first data by the transmission/reception subunit and (b) the reception of the second data by the transmission/reception subunit.

16. The group judgment device of claim 15,
wherein the transmission/reception subunit transmits to the reference device, as the first data, echo-request data based on the Internet Control Message Protocol, and receives from the reference device, as the second data, echo-reply data corresponding to the echo-request data.

17. The group judgment device of claim 15, further comprising:
a pre-storing unit operable to store therein a predetermined number of values of the reference time,
wherein the judgment unit employs, as the reference time to be used for the comparison, a smallest value, among the values stored in the pre-storing unit and a value of the measured reference time.

18. The group judgment device of claim 1,
wherein the judgment unit judges that the target device belongs to the group when the target time is equal to or less than the reference time, and judges that the target device is external to the group when the target time is not equal to or less than the reference time.

19. The group judgment device of claim 1,
wherein the group judgment device is connected to the target device via one router or via a plurality of routers, and
the judgment unit judges that the target device belongs to the group when the difference is less than a time required by the data with the predetermined format to travel via one router, and judges that the target device is external to the group when the difference is not less than the time required by the data with the predetermined format to travel via one router.

20. A group judgment method that is used by a group judgment device connected to a network, comprising:
a content request reception step of receiving a content distribution request, which is a request to distribute content, from a target device connected to the network;
a target time obtaining step of, when the content distribution request has been received in the content request reception step, obtaining, as a target time, a time required between (a) transmission of first data with a predetermined format to the target device and (b) reception of second data with the predetermined format from the target device, the second data being in response to the first data;
a judgment step of (i) comparing the target time with a reference time, the reference time being a time required between (a) transmission of the first data to a device belonging to a predetermined group and (b) reception of the second data from the device belonging to the group, the second data being in response to the first data, and (ii) judging that the target device belongs to the group when a difference between the target time and the reference time is within a predetermined range, and judging that the target device is external to the group when the difference is not within the predetermined range, the group being made up of one or more devices that are permitted to share the content; and
a content distribution step of distributing the content to the target device when the target device is judged to belong to the group in the judgment step.

21. A group judgment program stored on a non-transitory computer-readable storage medium that is implemented by a computer connected to a network, the group judgment program causing the computer to execute steps comprising:
a content request reception step of receiving a content distribution request, which is a request to distribute content, from a target device connected to the network;
a target time obtaining step of, when the content distribution request has been received in the content request reception step, obtaining, as a target time, a time required between (a) transmission of first data with a predetermined format to the target device and (b) reception of second data with the predetermined format from the target device, the second data being in response to the first data;
a judgment step of (i) comparing the target time with a reference time, the reference time being a time required between (a) transmission of the first data to a device belonging to a predetermined group and (b) reception of the second data from the device belonging to the group, the second data being in response to the first data, and (ii) judging that the target device belongs to the group when a difference between the target time and the reference time is within a predetermined range, and judging that the target device is external to the group when the difference is not within the predetermined range, the group being made up of one or more devices that are permitted to share the content; and
a content distribution step of distributing the content to the target device when the target device is judged to belong to the group in the judgment step.

22. A non-transitory computer-readable storage medium storing a group judgment program that is implemented by a computer connected to a network, the group judgment program causing the computer to perform steps comprising:
a content request reception step of receiving a content distribution request, which is a request to distribute content, from a target device connected to the network;

a target time obtaining step of, when the content distribution request has been received in the content request reception step, obtaining, as a target time, a time required between (a) transmission of first data with a predetermined format to the target device and (b) reception of second data with the predetermined format from the target device, the second data being in response to the first data;

a judgment step of (i) comparing the target time with a reference time, the reference time being a time required between (a) transmission of the first data to a device belonging to a predetermined group and (b) reception of the second data from the device belonging to the group, the second data being in response to the first data, and (ii) judging that the target device belongs to the group when a difference between the target time and the reference time is within a predetermined range, and judging that the target device is external to the group when the difference is not within the predetermined range, the group being made up of one or more devices that are permitted to share the content; and a content distribution step of distributing the content to the target device when the target device is judged to belong to the group in the judgment step.

\* \* \* \* \*